United States Patent
Santiago et al.

(10) Patent No.: US 7,688,853 B2
(45) Date of Patent: Mar. 30, 2010

(54) SYSTEM AND METHOD FOR HIERARCHICAL POLICING OF FLOWS AND SUBFLOWS OF A DATA STREAM

(75) Inventors: Rodolfo A. Santiago, St. Louis Park, MN (US); Scott A. Sarkinen, Mounds View, MN (US)

(73) Assignee: SLT Logic, LLC, Boston, MA (US)

( * ) Notice: Subject to any disclaimer, the term of this patent is extended or adjusted under 35 U.S.C. 154(b) by 1040 days.

(21) Appl. No.: 11/257,386

(22) Filed: Oct. 24, 2005

(65) Prior Publication Data

US 2006/0087969 A1    Apr. 27, 2006

Related U.S. Application Data

(62) Division of application No. 09/849,810, filed on May 4, 2001, now Pat. No. 7,042,848.

(51) Int. Cl.
*H04J 3/16* (2006.01)

(52) U.S. Cl. .................. 370/468; 370/235; 370/232; 370/230.1

(58) Field of Classification Search .................. None
See application file for complete search history.

(56) References Cited

U.S. PATENT DOCUMENTS

| | | | |
|---|---|---|---|
| 5,231,633 A | 7/1993 | Hluckyi et al. | |
| 5,231,663 A | 7/1993 | Earl et al. | |
| 5,260,935 A | 11/1993 | Turner | |
| 5,268,900 A | 12/1993 | Hluchyj et al. | |
| 5,455,825 A | 10/1995 | Lauer et al. | |
| 5,541,920 A | 7/1996 | Angle et al. | |
| 5,566,170 A | 10/1996 | Bakke et al. | |
| 5,570,360 A | 10/1996 | Klausmeier et al. | |
| 5,579,312 A | 11/1996 | Ragache | |
| 5,598,410 A | 1/1997 | Stone | |
| 5,600,598 A | 2/1997 | Skjveland et al. | |
| 5,629,936 A | 5/1997 | Lee et al. | |
| 5,666,353 A | 9/1997 | Klausmeier et al. | |
| 5,764,641 A | 6/1998 | Lin | |
| 5,781,531 A | 7/1998 | Charny | |
| 5,812,476 A | 9/1998 | Segawa | |

(Continued)

OTHER PUBLICATIONS

"EZCHIP Technologies Completes Filing Patent Applications for its 10/40G Network Processor Core Technology," http://www.ezchip.com/html/press000918.html, printed Jan. 22, 2001, pp. 1-3.

(Continued)

*Primary Examiner*—Duc C Ho
(74) *Attorney, Agent, or Firm*—Patterson, Thuente, Skaar & Christensen, P.A.

(57) ABSTRACT

A system and method for policing individual flows and subflows of a data stream. Data traffic streams are classified into separate traffic flows, which in turn can be further classified into subflows, thereby providing for different priority levels of subsets of the flow. The subflows may be still further classified into additional subflows, creating a hierarchical, layered prioritization that can be metered at each vertical and horizontal level of the hierarchy. A packet flow rate of each of the subflows is compared to a predefined rate limit to allow subflows of a flow to have different priorities therebetween.

9 Claims, 16 Drawing Sheets

U.S. PATENT DOCUMENTS

| | | | |
|---|---|---|---|
| 5,828,654 | A | 10/1998 | Takase et al. |
| 5,864,540 | A | 1/1999 | Bonomi et al. |
| 5,870,396 | A | 2/1999 | Abu-Amara et al. |
| 5,870,629 | A | 2/1999 | Borden et al. |
| 5,896,383 | A | 4/1999 | Wakeland |
| 5,901,095 | A | 5/1999 | Crafts |
| 5,907,511 | A | 5/1999 | Crafts |
| 5,923,596 | A | 7/1999 | Wu et al. |
| 5,923,656 | A | 7/1999 | Duan et al. |
| 5,943,481 | A | 8/1999 | Wakeland |
| 5,973,952 | A | 10/1999 | Crafts |
| 5,995,439 | A | 11/1999 | Watanabe et al. |
| 6,018,527 | A | 1/2000 | Yin et al. |
| 6,021,116 | A | 2/2000 | Chiussi et al. |
| 6,021,132 | A | 2/2000 | Muller et al. |
| 6,032,190 | A | 2/2000 | Bremer et al. |
| 6,046,979 | A | 4/2000 | Bauman |
| 6,046,980 | A | 4/2000 | Packer |
| 6,047,002 | A | 4/2000 | Hartmann et al. |
| 6,052,375 | A | 4/2000 | Bass et al. |
| 6,067,298 | A | 5/2000 | Shinohara |
| 6,072,800 | A | 6/2000 | Lee |
| 6,072,989 | A | 6/2000 | Witters et al. |
| 6,104,700 | A | 8/2000 | Haddock et al. |
| 6,108,305 | A | 8/2000 | Charny et al. |
| 6,118,761 | A | 9/2000 | Kalkunte et al. |
| 6,130,878 | A | 10/2000 | Charny |
| 6,136,638 | A | 10/2000 | Lee et al. |
| 6,141,686 | A | 10/2000 | Jackowski et al. |
| 6,166,403 | A | 12/2000 | Castagnetti et al. |
| 6,167,445 | A | 12/2000 | Gai et al. |
| 6,175,568 | B1 | 1/2001 | Awdeh |
| 6,185,635 | B1 | 2/2001 | O'Loughlin et al. |
| 6,259,699 | B1 | 7/2001 | Opalka et al. |
| 6,333,917 | B1 | 12/2001 | Lyon et al. |
| 6,335,935 | B2 | 1/2002 | Kadambi et al. |
| 6,449,656 | B1 | 9/2002 | Elzur et al. |
| 6,477,670 | B1 | 11/2002 | Ahmadvand |
| 6,538,989 | B1 | 3/2003 | Carter et al. |
| 6,594,268 | B1 | 7/2003 | Aukia et al. |
| 6,606,317 | B1 | 8/2003 | Beadle et al. |
| 6,608,816 | B1 * | 8/2003 | Nichols .................. 370/235 |
| 6,618,356 | B1 | 9/2003 | Bonaventure |
| 6,651,101 | B1 | 11/2003 | Gai et al. |
| 6,757,249 | B1 | 6/2004 | Kerjriwal et al. |
| 6,760,774 | B1 | 7/2004 | Soumiya et al. |
| 6,792,470 | B2 | 9/2004 | Hakenberg et al. |
| 6,798,746 | B1 * | 9/2004 | Kloth et al. ............. 370/235 |
| 6,826,147 | B1 | 11/2004 | Nandy et al. |
| 7,099,275 | B2 | 8/2006 | Sarkinen |
| 7,149,187 | B1 * | 12/2006 | Jacobson et al. ......... 370/235 |
| 7,151,744 | B2 | 12/2006 | Sarkinen |
| 2001/0007560 | A1 | 7/2001 | Masuda et al. |
| 2002/0097677 | A1 | 7/2002 | Hoar et al. |
| 2002/0116527 | A1 | 8/2002 | Chen et al. |
| 2002/0136230 | A1 | 9/2002 | Dell et al. |
| 2002/0196796 | A1 | 12/2002 | Ambe et al. |
| 2003/0046429 | A1 | 3/2003 | Sonksen |
| 2003/0112756 | A1 | 6/2003 | LeGouriellec et al. |
| 2003/0118029 | A1 | 6/2003 | Maher et al. |

OTHER PUBLICATIONS

"7-Layer Packet Processing: A Performance Analysis, White Paper," EZChip http://www.ezchip.com/html/tech_7layers.html, Retrieved Jan. 22, 2001, pp. 1-8.

"Network Process Designs for Next-Generation Networking Equipment, White Paper," EZChip, http://exchip.com/html/tech_nsppaper.html, Retrieved Jan. 22, 2001, pp. 1-8.

"Gilder Technology Report," EZChip, Sep. 2000, http://www.exchip.com/html/gilder.html, Retrieved Jan. 22, 2001, pp. 1-2.

"Frame Based ATM over SONET/SDH Transport (FAST)," The ATM Forum, Technical Committee, fb-fbatm-0151.000, Jul. 2000, 37 pages.

Heinanen et al., "A Single Rate Three Color Marker," University of Pennsylvania, Sep. 1999, pp. 1-6.

Heinanen et al., "A Two Rate Three Color Marker," University of Pennsylvania, Sep. 1999, pp. 1-5.

"Putting Routing Tables in Silicon," IEEE Network, vol. 6, No. 1, Jan. 1992, pp. 11.

U.S. Appl. No. 09/849,810, filed May 4, 2001, Santiago et al.

William Wong, "Network Processors Take The High Road . . . And The Low Road", Electronic Design, Jul. 10, 2000; http://www.planetee.com/planetee/servlet/Display-Document?Article ID=6798; Retrieved Jun. 15, 2001; 3 pages.

"Network Processors Take The High Road . . . And The Low Road", Electronic Design, Jul. 10, 2000; http://www.planetee.com/planetee/servlet/Display-Document?Article ID=6799; Retrieved Jun. 15, 2001; 2 pages.

"Network Processors Take The High Road . . . And The Low Road", Electronic Design, Jul. 10, 2000; http://www.planetee.com/planetee/servlet/Display-Document?Article ID=6800; Retrieved Mar. 7, 2002; 3 pages.

"Network Processors Take The High Road . . . And The Low Road", Electronic Design, Jul. 10, 2000; http://www.planetee.com/planetee/servlet/Display-Document?Article ID=6802; Retrieved Jun. 15, 2001; 1 page.

"Network Processors Take The High Road . . . And The Low Road", Electronic Design, Jul. 10, 2000; http://www.planetee.com/planetee/servlet/Display-Document?Article ID=6804; Retrieved Jun. 15, 2001; 1 page.

"Network Processors Take The High Road . . . And The Low Road", Electronic Design, Jul. 10, 2000; http://www.planetee.com/planetee/servlet/Display-Document?Article ID=6806; Retrieved Jun. 15, 2001; 1 pages.

"Network Processors Take The High Road . . . And The Low Road", Electronic Design, Jul. 10, 2000; http://www.planetee.com/planetee/servlet/Display-Document?Article ID=6808; Retrieved Jun. 15, 2001; 3 pages.

Bossardt et al.; "ABR Architecture and Simulation for an Input-Buffered and Per-VC-Queued ATM Switch", Department of Electrical and Computer Engineering, University of Illinois; 6 pages.

"C-5™ Digital Communications Processor", C-Port, A Motorola Company, Product Brief, Date Unknown; 8 pages.

David Husak; "Network Processors: A Definition and Comparison", C-Port, A Motorola Company, May 3, 2000; 8 pages.

"Products", Applications, C-Port, A Motorola Company, http://www.cportcorp.com/products/applications.htm; Retrieved Jan. 23, 2001; 3 pages.

David Husak et al., "network Processor Programming Models: The Key to Achieving Faster Time-To=Market and Extending Product Life", C-Port, A Motorola Company, May 4, 2000; 8 pages.

"Asynchronous Transfer Mode (ATM)", http://iwander.vlsi.uiuc.edu/abr/atmintro.html; printed Apr. 26, 2001; pp. 1-5.

U.S. PAIR File Wrapper History for U.S. Appl. No. 09/849,810, filed May 4, 2001.

* cited by examiner

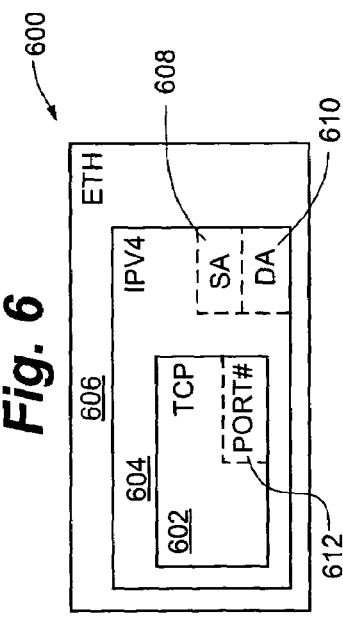
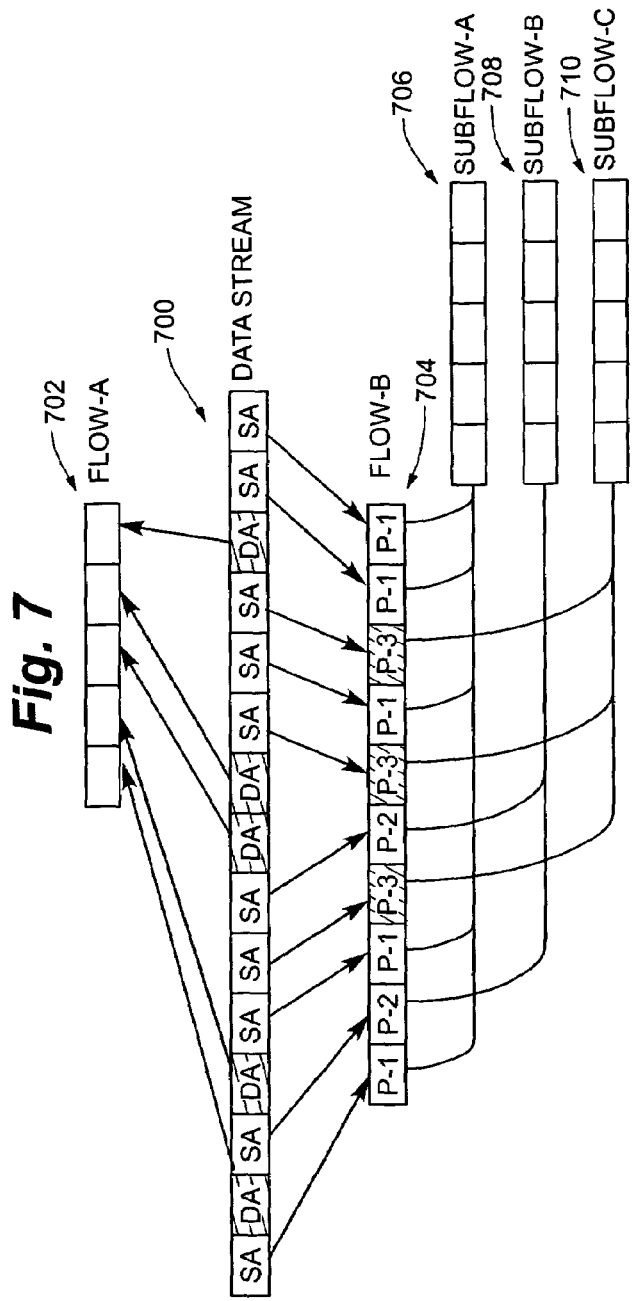

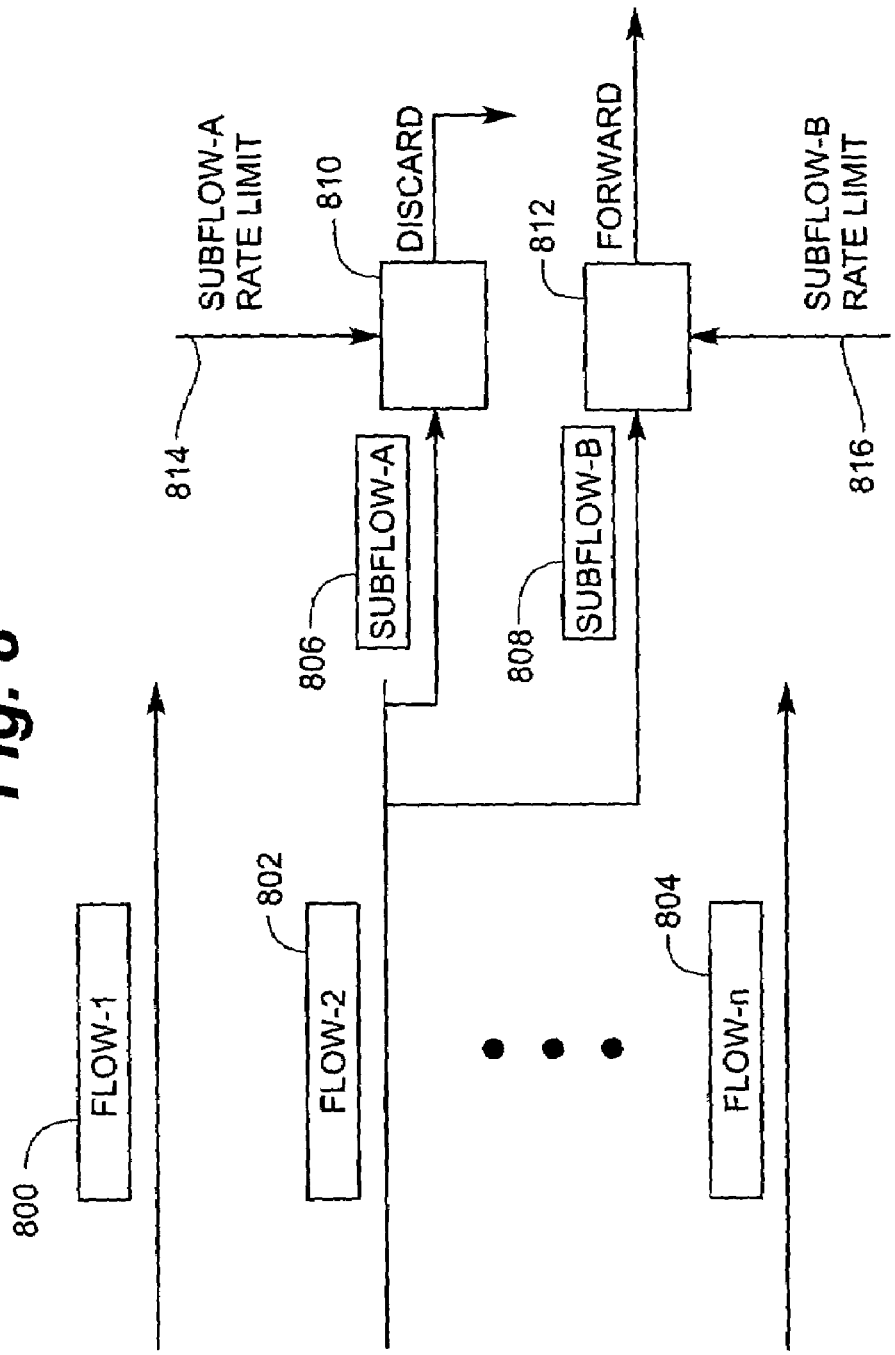

Fig. 14
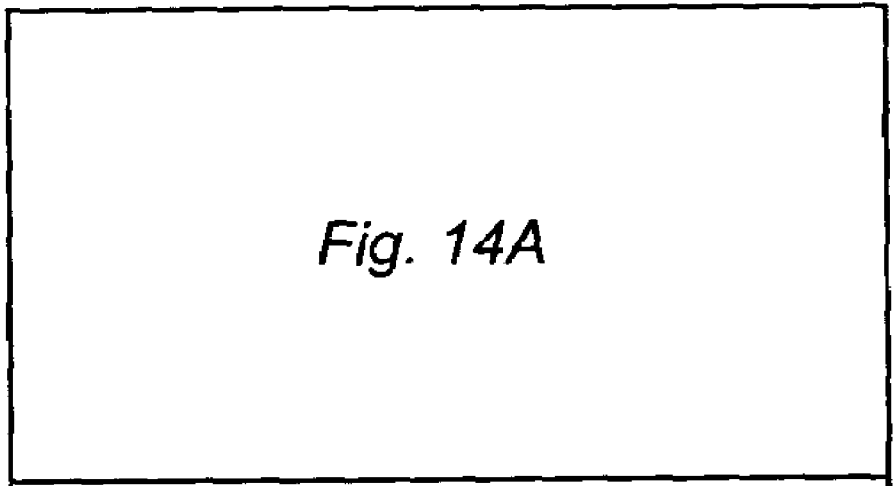
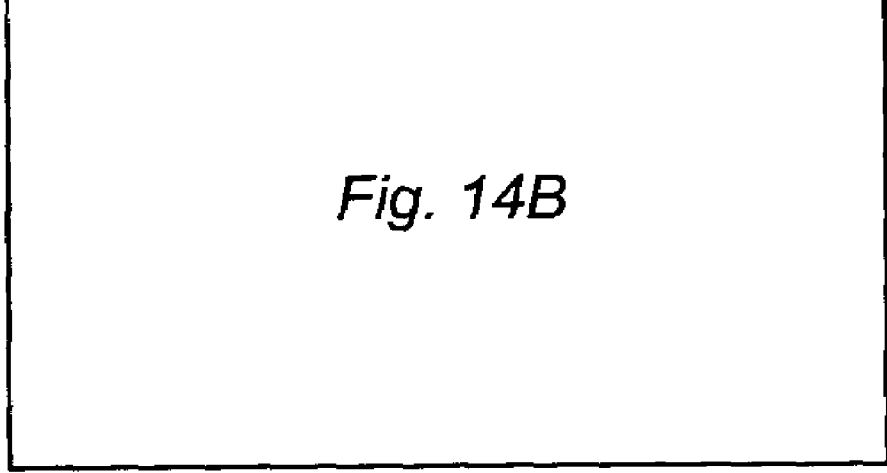

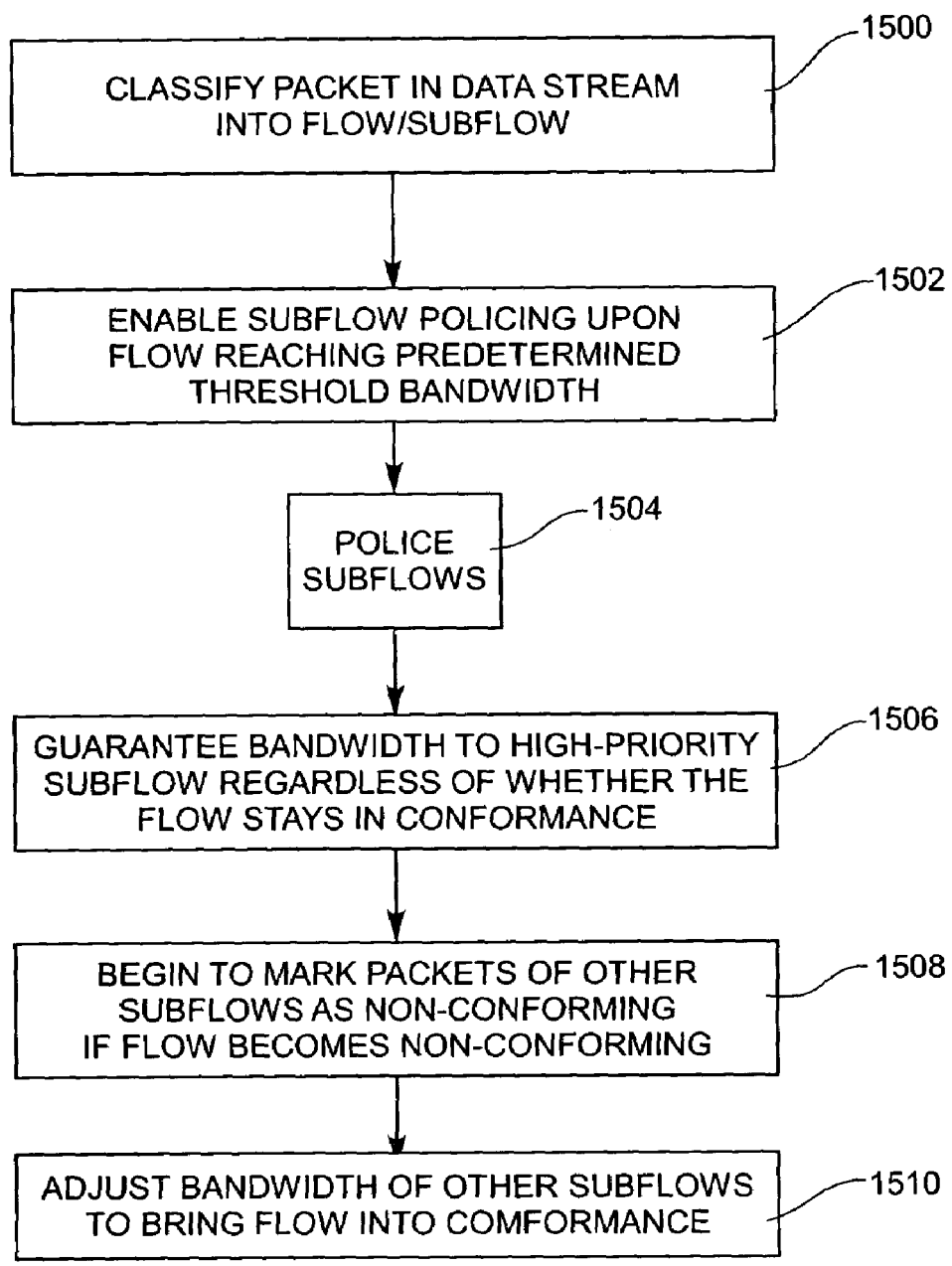

SYSTEM AND METHOD FOR HIERARCHICAL POLICING OF FLOWS AND SUBFLOWS OF A DATA STREAM

RELATED APPLICATION

This application is a division of application Ser. No. 09/849,810 filed May 4, 2001 now U.S. Pat. No. 7,042,848.

CROSS-REFERENCE TO OTHER PATENT APPLICATIONS

The following co-pending patent applications of common assignee contains some common disclosure:

"System And Method For Providing Transformation Of Multi-Protocol Packets In A Data Stream," U.S. patent application Ser. No. 09/849,804, filed May 4, 2001, which is incorporated herein by reference in its entirety;

"A Method And Apparatus For Providing Multi-Protocol, Multi-Stage, Real-Time Frame Classification", U.S. Pat. No. 6,904,057, issued Jun. 7, 2005, which is incorporated herein by reference in its entirety;

"System And Method For Policing Multiple Data Flows And Multi-Protocol Data Flows," U.S. Pat. No. 6,901,052, issued May 31, 2005, which is incorporated herein by reference in its entirety.

FIELD OF THE INVENTION

This invention relates in general to communication networks, and more particularly to a method and apparatus for providing policing of individual flows and subflows of a data stream.

BACKGROUND OF THE INVENTION

Enhancing today's networking technology is a perpetual goal in the communications industry. As the raw speeds of large-scale and personal computing devices soar, the tremendous increase in data transmission demands continue to push the networking bandwidth envelope to capacity. As bandwidth-intensive multimedia content continues to gain popularity and course the veins of the Internet, the unrelenting bandwidth dilemma is no less urgent today than yesterday.

In order to make the most efficient use of the communication paths and routing equipment possible, policing methods were devised. Users of various levels could obtain different qualities of service (QoS), which would then require "policing" to ensure conformance with the contracted QoS. Policing generally refers to the packet-by-packet monitoring function at a network border, such as an ingress point at a network node. This monitoring function ensures that the promised QoS is not violated. The amount of traffic flowing into or out of a particular interface may therefore require limiting actions to achieve a specific policy goal.

Currently, varying data protocols require different methods for policing traffic flows. For example, the ATM Forum's FAST (Frame Based ATM over Sonet/SDH Transport) data link protocol and the Internet Engineering Task Force (IETF)'s IP data link protocol require different methods for policing traffic flows. FAST, being based on ATM cells, recommends the use of a variant of the GCRA, referred to as the Frame Based GCRA (F-GCRA). F-GCRA is the policing method provided in the ATM Forum's specification of FAST, and the Internet Engineering Task Force (IETF)'s IP packet policing generally involves the use of either Single Rate Three Color Marker (srTCM) or Two Rate Three Color Marker (trTCM) techniques.

At a particular network node or other ingress point, individual packets that make up a communications traffic stream can be classified into several flows or connections. Different qualities of service (QoS) can be committed per flow by metering packets arriving at a given interface on a flow-by-flow basis. Flows whose effective bit rate exceeds what is committed in the service contract will be classified as non-conforming, and packets arriving at a time when its corresponding flow is non-conforming will be marked as non-conforming. Whether packets are marked as non-conforming affects the likelihood of the packets being discarded. This metering of packets, i.e., policing, for the purpose of providing differentiated service per flow helps to regulate the bandwidth.

When within bandwidth constraints, policing by flow results in a common drop probability for all packets associated with that same flow. There are, however, circumstances where packets associated with certain types of messages within a flow should be afforded a higher probability of completing their routes. For example, in a residential broadband Internet connection, multiple services, such as video on demand, may be provided on the same connection. In such a case, it may be desirable to provide video packets a higher priority than the HTML packets, but within the bandwidth constraints committed to the household by the service provider.

Accordingly, there is a need in the communications industry for a method and apparatus for providing a layered approach to policing. A further need exists to provide policing of individual flows, as well as subflows of a data stream. The present invention fulfills these and other needs, and offers other advantages over the prior art policing approaches.

SUMMARY OF TH INVENTION

To overcome limitations in the prior art described above, and to overcome other limitations that will become apparent upon reading and understanding the present specification, the present invention discloses a system, apparatus and method for policing of individual flows and subflows of a data stream. The present invention allows prioritizing and policing of communications packets using multiple levels of classification and metering, by classifying traffic streams into separate traffic flows, and further classifying these flows into "subflows" providing for different priority levels of subsets of the flow. The subflows may be still further classified into additional subflows, creating a hierarchical, layered prioritization that can be metered at each vertical and horizontal level of the hierarchy. Thus, during periods of high transfer rates from a flow, the allocation of remaining bandwidth for that particular flow may be biased towards packets associated with subflows of higher priority.

In accordance with one embodiment of the invention, a method is provided for policing communications packets. The method includes classifying the data stream into at least one traffic flow, and classifying at least one of the traffic flows into a plurality of first level subflows. The method includes measuring a rate of each of the first level subflows associated with the traffic flow, when the traffic flow reaches a predetermined bandwidth threshold. The packets associated with each of the first level subflows are marked with one of a plurality of conformance indicators based on the measured rate of the respective first level subflow. In a more particular embodiment, a rate limit may be associated with each of the first level subflows, which can then be compared to the packet rate of the respective first level subflow in order to determine whether or not that subflow is conforming, non-conforming, or some stage of conformance therebetween. Addition subflow levels may be derived from the existing subflow levels, such as classifying a first level subflow into a plurality of second level subflows, classifying one or more of the second level subflows into a plurality of third level subflows, and so forth. A computer-readable medium having computer-executable instructions for performing such policing functions is also provided.

In accordance with another embodiment of the invention, a method is provided for facilitating layered policing of packets of a data stream. The method includes parsing the data stream into a plurality of flows. For any of the flows, at least one characteristic common to a first subset of the flow is identified. A first drop probability is associated with each of the packets of the first subset having the common characteristic, and a second drop probability is associated with at least one other subset of the flow. In this manner, different drop probabilities for different subsets of the flow is provided.

In accordance with another embodiment of the invention, a packet policing system for providing layered policing of packets of a data stream is provided. A classifier receives and parses the data stream into a plurality of traffic flows, and parses at least one of the traffic flows into a plurality of subflows. A policing engine is coupled to the classifier to receive each of the subflows, and to individually meter each of the subflows associated with each traffic flow in accordance with predefined subflow priorities assigned to each of the subflows.

In accordance with another embodiment of the invention, a method is provided for maximizing exploitation of a contracted bandwidth for a flow. The flow is parsed into a high-priority subflow and at least one standard subflow. Rate limits are assigned to the high-priority subflow and the standard subflow. Packet conformance is monitored on a subflow level when the flow decreases to a predetermined bandwidth capacity. Guaranteed bandwidth is provided to the high-priority subflow while providing best effort bandwidth to the at least one standard subflow, regardless of whether the flow has exceeded its contracted bandwidth. If the flow has exceeded its contracted bandwidth, the bandwidth of the standard subflow is adjusted to bring the flow into conformance, while maintaining the guaranteed bandwidth to the high-priority subflow.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

FIG. 6 illustrates an example of a packet having fields in which flow and subflow classification can be based;

FIG. 7 illustrates an example of how a data stream can be classified into flows and subflows;

FIG. 8 is a block diagram illustrating how flows and subflows may be individually policed;

FIG. 15 is a flow diagram illustrating an embodiment as described above, where exploitation of the available bandwidth of the flow can be maximized by guaranteeing conformance for one subflow, while using best efforts for other subflows beyond their respective rate limits.

DETAILED DESCRIPTION OF THE DRAWINGS

In the following description of an exemplary embodiment, reference is made to the accompanying drawings which form a part hereof, and in which is shown by way of illustration specific embodiments in which the invention may be practiced. It is to be understood that other embodiments may be utilized, as structural and operational changes may be made without departing from the scope of the present invention.

Generally, the present invention is directed to a system and method for prioritizing and policing communications packets using multiple levels of classification and metering. The invention provides for classification of traffic streams into separate traffic flows, and for the further classification of each traffic flow into subflows which can have different levels of priorities within the flow. The subflows may be further classified into additional subflows. Thus, during periods of high transfer rates from a flow, the allocation of remaining bandwidth for that flow will be biased towards packets associated to subflows of higher priority.

A significant portion of the ensuing description is presented in terms of an exemplary policing engine embodiment according to the invention, in which particular examples of packet protocols and policing methodologies may be described in order to facilitate an understanding of various aspects of the invention. It should be recognized however, and will become readily apparent to those skilled in the art from a reading of the following description, that different packet protocols and policing methodologies other than those presented in the illustrated embodiments are contemplated by the invention. Therefore, the following references to the exemplary embodiments are illustrative examples, and the invention is clearly not limited thereto.

In order to gain a better understanding of the invention, a description of an exemplary networking environment in which the present invention is applicable is provided.

Data transmitted over networks such as the Internet 10 may be in the form of e-mail messages, file transfers and downloads, web page loading, and the like. The data is generally broken up into a number of data packets, each of which is assigned a header to direct the data packet to the desired destination, among other things. Each packet is separately dispatched to the destination, although more than one different route may be taken by the different packets associated with the data.

Figure 1:
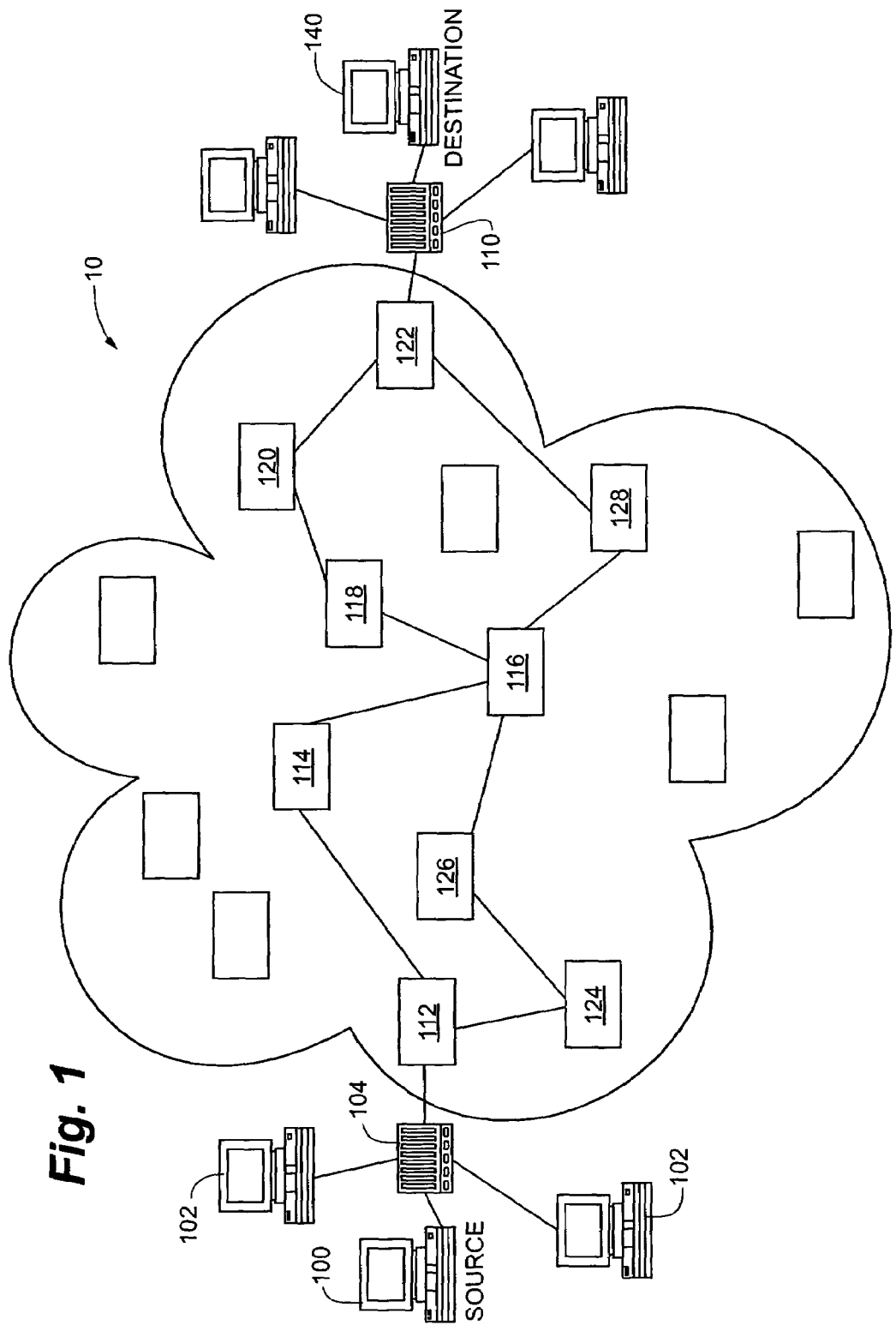
FIG. 1 is a block diagram illustrating a networking environment in which the principles of the present invention may be applied.

For example, the source computer 100 of FIG. 1 may be configured in a local area network (LAN) and coupled to other computers 102 via a hub 104. A first one or more data packets may reach the hub 110 of the destination LAN via a first path, through routers 112, 114, 116, 118, 120 and 122. A second one or more data packets may reach the hub 110 via a second path, such as through routers 112, 124, 126, 116, 128 and 122. These different packets may take alternative routes due to equipment congestion or failure of a node, or to load share where possible. The routers associated with the core of the Internet can reconfigure the paths that these packets follow. This is due to the router's ability to analyze the header information corresponding to the data packet, and to communicate line condition and other information between routers. The routers handling data at the major traffic points on large networks, such as the Internet, are generally large stand-alone systems. After transmitting the data from node to node through the network, the packets are reassembled at the receiving end, and availed to the desired destination system 140.

In connection with the transmission of packets through the network is the concept of quality of service (QoS) and policing. The QoS refers to the ability of the network to accommodate different service levels to selected network traffic. The goal of implementing quality of service parameters is to prioritize certain flows over other flows based on some criteria. For example, priority may include dedicated bandwidth, controlled jitter and latency, improved loss characteristics, and the like. This can be performed, for example, by raising the priority of a flow or limiting the priority of another flow. Thus, each flow traversing the switches/routers shown in FIG. 1 may be subject to a quality of service parameter that affects the speed and reliability in which the packets are transmitted.

Networking that implements such quality of service parameters is often referred to as policy-based networking. Policy-based networking is the management of the network so that various kinds of traffic (e.g., data, voice, video, etc.) obtains the availability and bandwidth needed to serve the network's users effectively. Using policy statements, network administrators can specify which kinds of service to give priority, at what times, and at what parts of their IP-based network. A policy-based network may include a network management console where policies are entered, modified, or retrieved from a policy repository. A policy decision point (PDP) is typically a server that retrieves policies from the policy repository, and acts on the policies on behalf of routers, switches, and other network devices that enforce the policies throughout the network.

As will be described more fully below, the present invention may be used in connection with such routers, switches, and other network devices that enforce such policies. Such a module is referred to herein as a policing engine or policer, and refers to the structural and/or operational module used to carry out the policing functions according to the present invention. Further, the present invention may be used in connection with multiprotocol flow classifying/parsing systems, as well as appropriate editing (also referred to as "packet transformation") systems to carry out marking where required. In one embodiment of the invention, the policing engine in accordance with the present invention is housed in a package or chip common to the classifier and editing functionalities. The device enables advanced services to be applied at speeds of 10 Gbps or more. Tightly coupled parsing, policing, and packet transformation allows the collective device to perform dynamic packet transformation for quality of service (QoS) based on the current flow state and also effectively handles dynamic header processing such as required by multiprotocol label switching (MPLS) routers.

Figure 2:
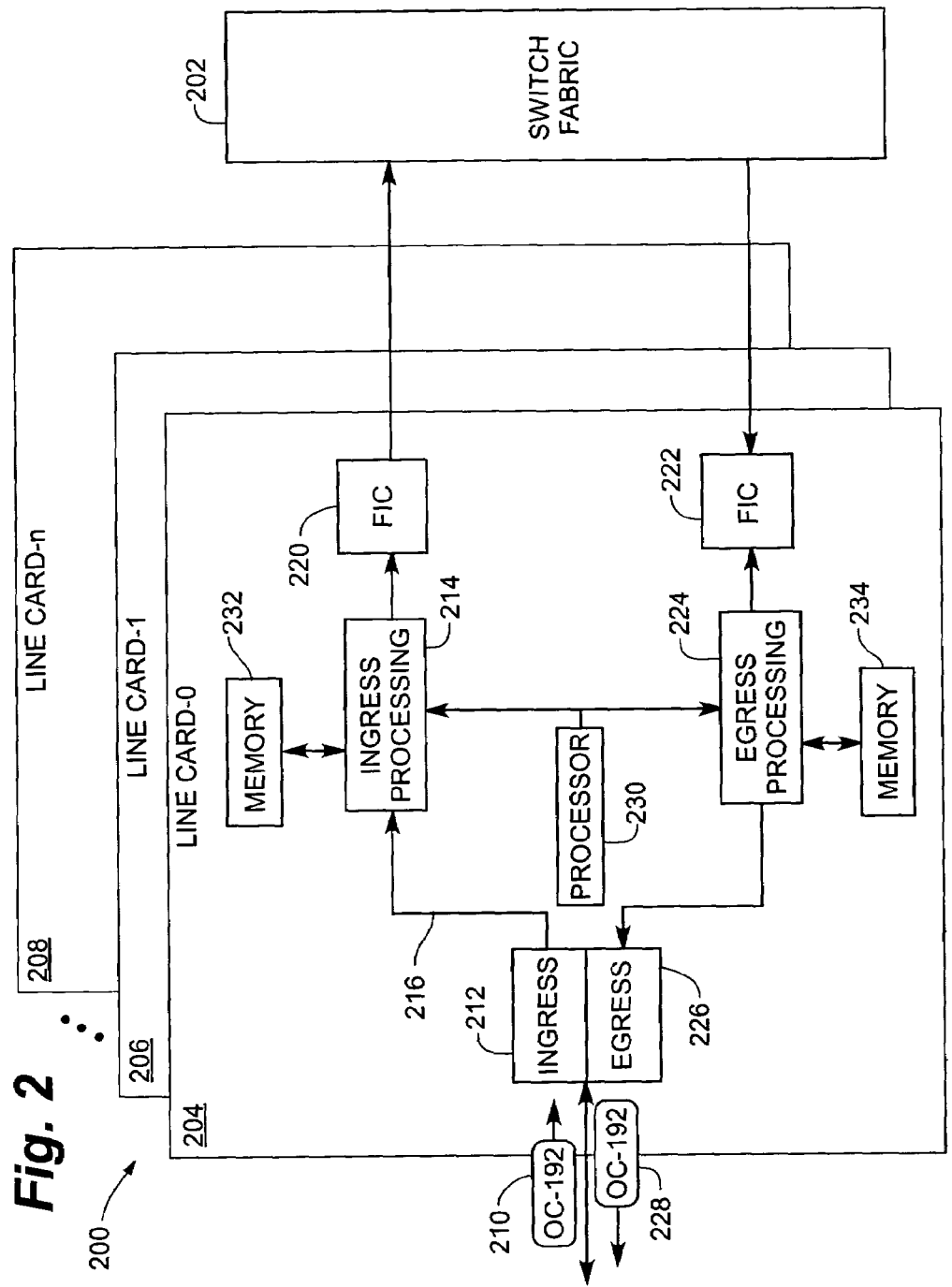
FIG. 2 is a block diagram of an embodiment of a router system in which the present invention may be applied.

Referring now to FIG. 2, one embodiment of a router system 200 is illustrated in which the present invention may be applied. One or more line cards are provided, each of which are coupled to a switch fabric 202. In the present example, a plurality of line cards are provided, including line card-0 204, line card-1 206 through a finite number of line cards represented by line card-n 208. In one embodiment of the invention, each of the line cards utilize analogous circuitry. Line card-0 204 will therefore be described, with the understanding that one or more of the remaining line cards in the router system may implement analogous circuitry.

The line card-0 204 of the illustrated embodiment receives as input packet-over-SONET/SDH (POS) frames via the network. As is known in the art, SONET/SDH is a high-speed time division multiplexing (TDM) physical-layer transport technology. POS provides a means for using the speed and management capabilities of SONET/SDH to optimize data transport, although originally optimized for voice. A SONET/SDH frame is 810 bytes and is normally represented as a two-dimensional byte-per-cell grid of 9 rows and 90 columns. The SONET/SDH frame is divided into transport overhead and payload bytes. The transport overhead bytes include section and line overhead bytes, while the payload bytes are made up of the payload capacity and some more overhead bytes referred to as path overhead. The overhead bytes are responsible for the management capabilities of SONET/SDH. The basic transmission rate of SONET (51.840 Mbps), referred to as Synchronous Transport Signal level 1 (STS-1), is achieved by sampling the 810-byte frames at 8000 frames per second. SONET features an octet-synchronous multiplexing scheme with transmission rates in multiples of 51.840 Mbps, whereby STS-192 thereby provides transmission at approximately 10 Gbps. Packet Over SONET/SDH (POS) allows core routers to send native IP packets directly over SONET/SDH frames. POS provides a relatively low packet overhead and cost per Mbit than other data transport methods, which allows POS to efficiently support increases in IP traffic over existing and new fiber networks.

As shown in the exemplary embodiment of FIG. 2, incoming POS OC-192 frames 210 originate from an OC-192 framer (not shown) and arrive at the line card-0 204 at the ingress interface 212. The frames are transferred to the ingress processing circuit 214 via an interface 216, such as the Optical Internetworking Forum (OIF) System Packet Interface-4 (SPI-4). OIF SPI-4 describes a data path interface between the physical and link layers to support physical line data rates up to 10 Gb/s, and may be used in connection with the present invention, as may other interfaces of appropriate speed.

Ingress processing circuit 214, which in one embodiment of the invention is housed in a single chip, performs the necessary lookups, policing, and editing of the packet. If necessary, the frame can be redirected to the host. The frames are fed out of the ingress processing circuit 214 via an OIF SPI-4 interface 218 to a Fabric Interface Chip (FIC) circuit 220. The FIC 220 converts the stream from one format to another, such as from POS frames to Common Switch Interface (CSIX) cells, and distributes the cells over the switch fabric 202.

Similarly, cells switched at the switch fabric 202 may be received at the FIC 222 and provided to the egress processing circuit 224. Frames are transferred to the egress interface 226 and output as POS OC-192 frames 228. A processor 230 may be coupled to the ingress processing circuit 214 and the egress processing circuit 224 to perform a variety of functions, including providing coprocessor support. Memories 232, 234 represent one or more memories associated with the ingress processing module 214 and the egress processing module 224 respectively.

Figure 3:
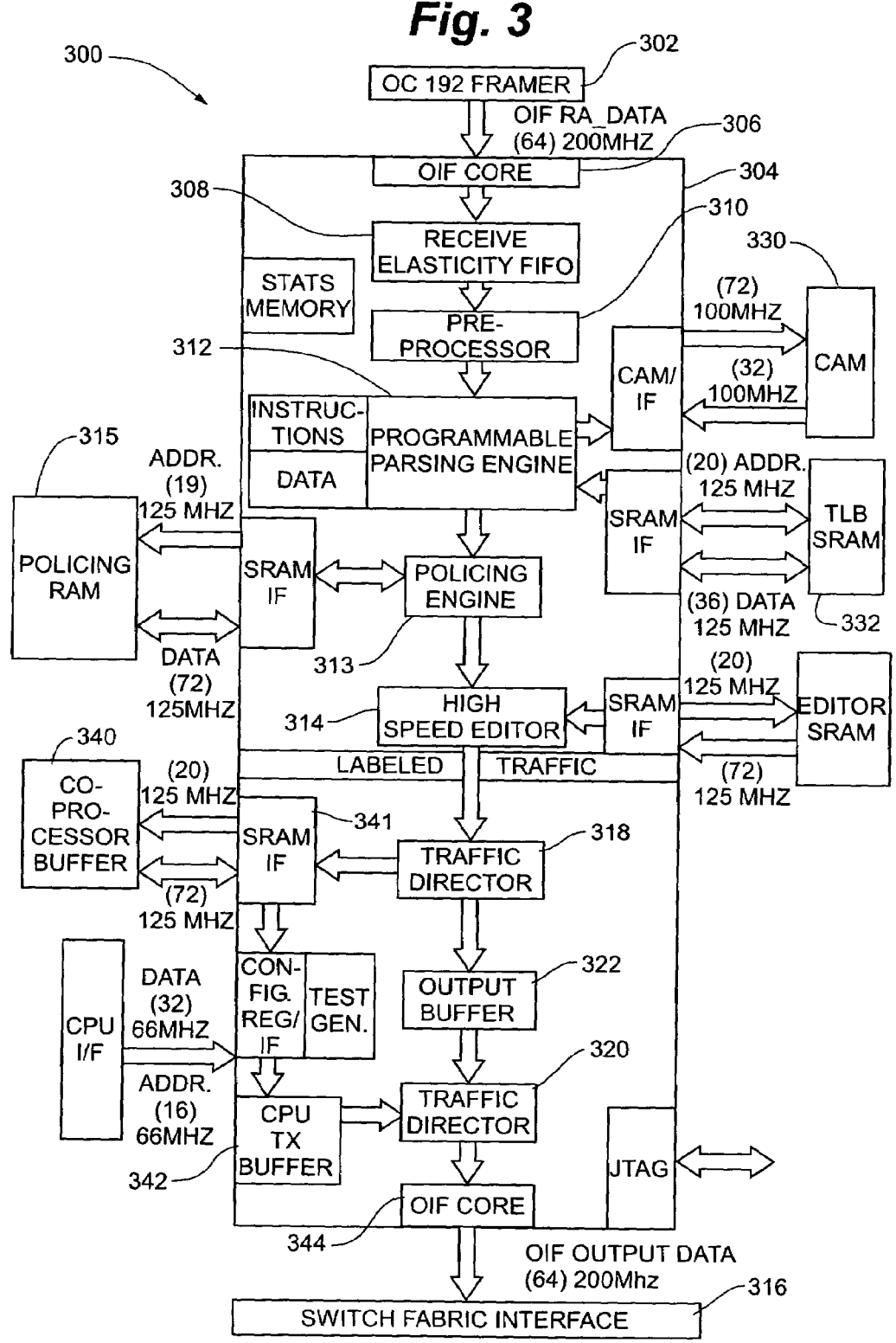
FIG. 3 is a block diagram of an exemplary embodiment of an ingress processing system in accordance with the present invention.

Referring now to FIG. 3, an exemplary embodiment of an ingress processing system 300 in accordance with the present invention is provided. The system 300 is described as an example of a system in which the principles of the present invention may be applied. The ingress processing system 300 interfaces to industry standard physical layer devices such as an OC-192 framer 302. In one embodiment of the invention, a portion of the ingress processing system 300 is housed on a single chip, illustrated in FIG. 3 as chip 304. While the invention is equally applicable where the physical chip boundaries differ from that illustrated in FIG. 3, the present invention is particularly efficient and useful in such a tightly coupled arrangement.

The interface 306, such as an OIF interface, provides the interface between the ingress processing circuit 304 and the framer 302. In one embodiment, the interface 306 is a 200 MHz OIF SPI-4 interface including a 64-bit data input. An elasticity buffer 308, which in one embodiment is a first-in-first-out (FIFO), allows table maintenance updates to be performed without dropping frames.

The pre-processor 310 performs a variety of functions, including packet verification and discarding, packet protocol identification, statistics compilation, and others. The packet protocol identification includes classifying the type of frame that has been received. The pre-processor identifies each layer protocol using a multistage algorithm coupled with a content-addressable memory (CAM) and memory (such as an SRAM) for resolving protocols. The frame is then stored in a memory along with the result of the preprocessor, i.e., the protocol layer code.

The parsing engine 312 performs layer classification and tagging via a search engine. One of the various functions of the parsing engine 312 is to parse the frames processed by the pre-processor, and generate search keys from data anywhere within the frame. The protocol layer code is used as a start vector into an instruction memory, which contains instructions for the parsing engine 312 and pointers to access selected words in a frame buffer. The parsing engine 312 receives the instruction and performs the functions selected by the corresponding instruction operational code. The results are used with an extractor that builds search keys which can be applied against a CAM (or indexed directly to a memory) to generate "search results" that contain the frame classification.

The policing engine 313 performs a variety of functions, including ensuring flow conformance to a maximum allowed peak rate and a contractually obliged committed rate flow, e.g., DiffServ IP and MPLS. The policing engine 313 works with memory, such as policing RAM 315 which stores a drop policy for each connection. The policing engine, the subject of the present invention, is described in greater detail below.

The editor 314, also referred to as a packet transformation engine, utilizes the search results to index the appropriate editing instructions to be executed by an editing module. The editor 314 facilitates execution of multiple edits or "transformations" per packet as streaming data of various networking protocols associated with different networking layers is input into the editing module. The editor 314 supports comprehensive packet manipulation capability, including full MPLS labels, DAC operations such as multiple push and pop operations, as well as traditional routing operations such as TTL edits, checksum edits, and other routing operations. As described more fully below, the editor 314 carries out the policing edits required by the policing engine's enforcement of a QoS.

The labeled traffic is ultimately directed to the switch fabric interface 316 through one or more traffic directors 318, 320 and output buffer 322. The traffic director 318 accepts frames from the editor 314, which are then passed to an output buffer 322 and/or the processor buffer 340 via the interface 341. Traffic director 320 accepts frames from the output buffer 322 and the processor transmit buffer 342, and passes the frames to the OIF interface 344 to the switch fabric interface 316.

Figure 4:
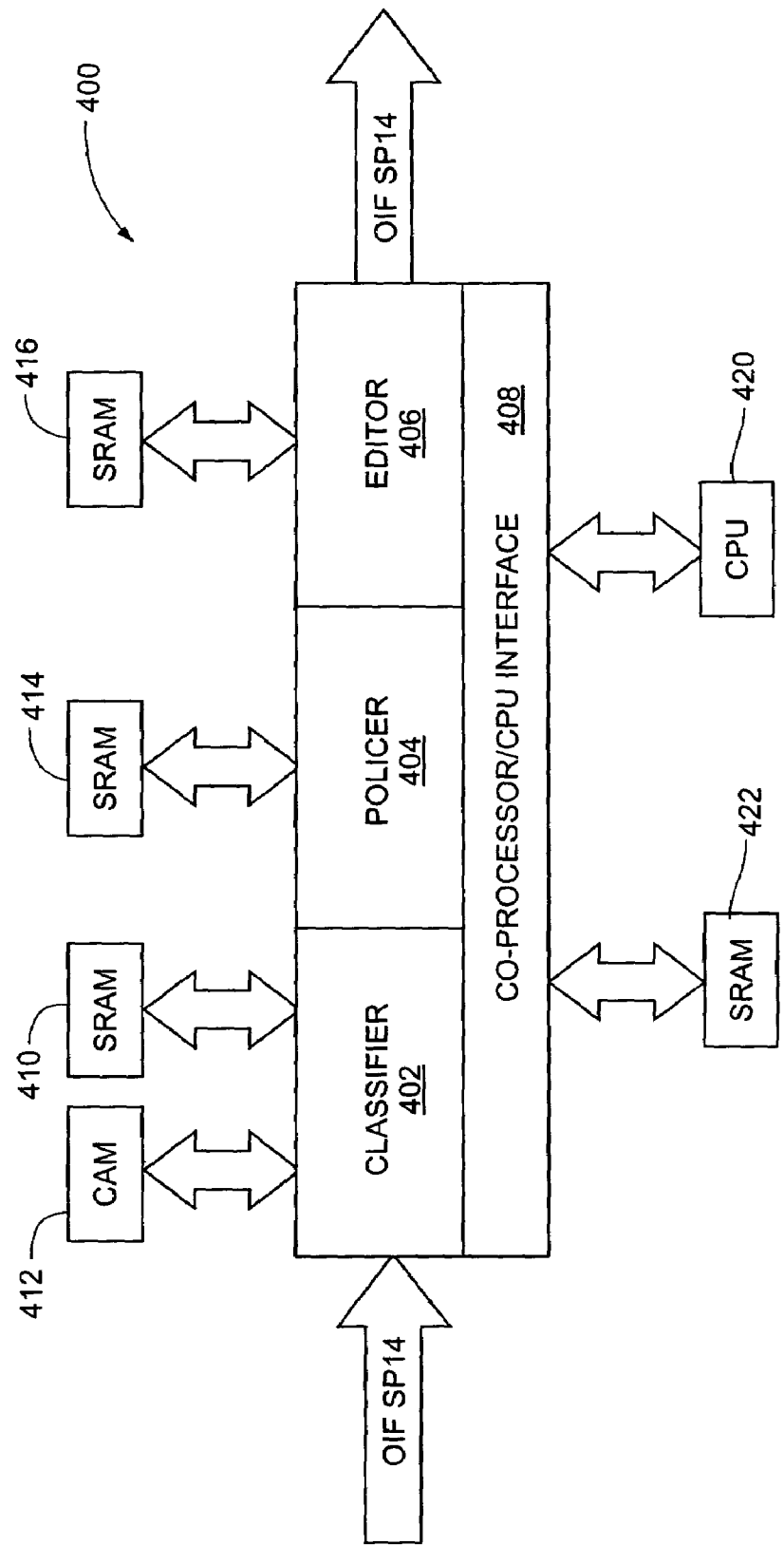
FIG. 4 is a block diagram illustrating selected functional blocks of an ingress processing system in accordance with the invention.

FIG. 4 is a block diagram illustrating selected functional blocks of an ingress processing system such as that described in connection with FIG. 3. The ingress processing system 400 of FIG. 4 illustrates the classifier functional block 402, the policer functional block 404, and the editor functional block 406. As described above, the classifier 402 builds queries (search words) to directly index a memory, such as an SRAM 410, or alternatively may search against a CAM 412 which in turn provides addresses to the SRAM 410. It should be noted that the SRAMs described in connection with FIG. 4 are illustrated for purposes of example, as any type of memory may be used rather than SRAM. Therefore, while the description provided herein generally refers to such memory as SRAM, the invention is clearly not limited to any particular type or technology of memory.

The policer 404 performs a variety of functions, including ensuring flow conformance to a maximum allowed peak rate and a contractually obliged committed rate flow flows, e.g., DiffServ IP and MPLS. The policer 404 works with memory, such as SRAM 414 which stores a drop policy for each connection. The editor 406 supports policing results and makes other appropriate modifications to the packet before being output from the ingress processing system 400. An external memory, such as SRAM 416, may be used to store the editor instructions. The coprocessor/CPU interface 408 provides for coprocessor/CPU support via interface 408, thereby allowing processor control, configuration, etc. of the classifier 402, policer 404 and editor 406. The interface 408 allows the system 400 to be coupled to a coprocessor and/or other CPU such as CPU 420, and to memory such as SRAM 422. In this manner, the ingress processing system 400 receives incoming packets, classifies and parses the packets according to predetermined criteria such as protocol, enforces policing functions on the packets, and modifies the packets accordingly before outputting the packets to the switch fabric.

In one embodiment of FIG. 4, the classifier 402, policer 404, editor 406 and coprocessor/CPU interface 408 are all provided on a single chip. The unique architecture combines the three key functions of classifying, policing, and editing the data all through the tightly coupled arrangement facilitated by the integration into a common chip.

Figure 5:
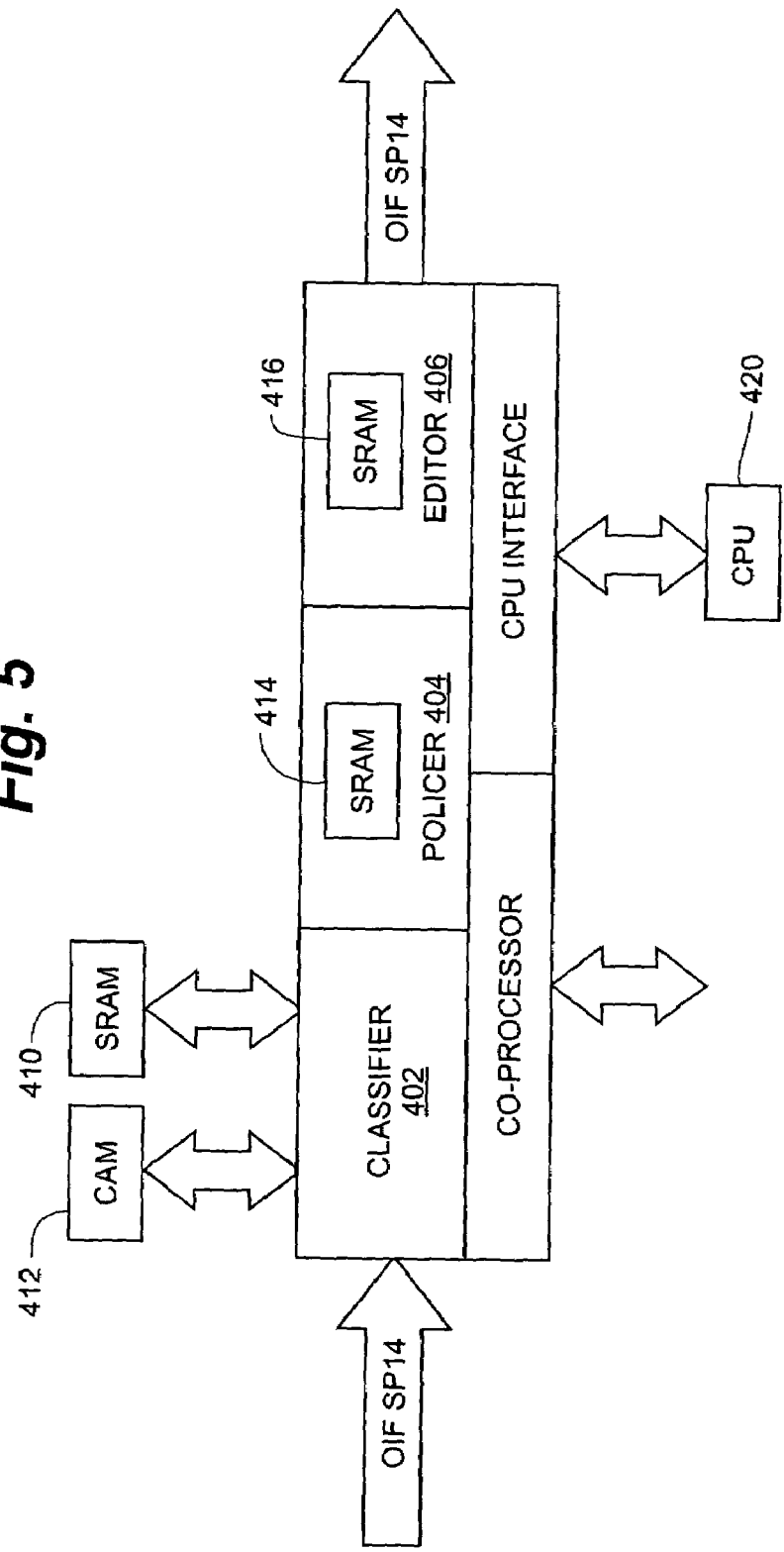
FIG. 5 is a block diagram illustrating selected functional blocks of an ingress processing system utilizing embedded memory in accordance with the invention.

The buffers and memory identified in FIG. 4 may also be incorporated into the common chip, as shown in the embodiment of FIG. 5. In FIG. 5, the SRAM 414 is integrated with the policer 404, the SRAM 416 is integrated with the editor 406, and so on. Embedding these memories on the chip provides a lower chip count solution and increased "per flow" statistics. Again, the memories identified as SRAMs may be any type of memory, and in fact, one embodiment of the invention utilizes dynamic RAM (DRAM) when the memory has been embedded into the chip as shown in FIG. 5. Therefore, while the description provided herein generally refers to such memory as SRAM, the invention is clearly not limited to any particular type or technology of memory.

The present invention may be used in connection with a networking environment such as that described above. The invention may be used in other networking environments, where a stream of data packets, frames, cells, etc. enters a node or other check point where policing of the data stream can be accomplished.

When within bandwidth constraints, policing by flow results in a common drop probability for all packets associated with that flow. There are circumstances where packets associated with certain types of messages within a flow should be afforded a higher probability of completing their routes. For example, in a residential broadband Internet connection, multiple services, such as video on demand, may be provided on the same connection. In such a case, it may be desirable to provide video packets a higher priority than the HTML packets, but within the bandwidth constraints committed to the household by the service provider.

The present invention provides such a system and method, and provides for hierarchical policing of a data stream. The data stream may be parsed or otherwise classified into one or more traffic flows, and each flow may be parsed or otherwise classified into subflows. The different subflows may be associated with different priority levels, so that some subflows have a lesser likelihood of being discarded or being marked for discarding (or other traffic policing function) than other subflows of the same flow. Thus, during periods of high transfer rates from a flow, the allocation of remaining bandwidth for that flow will be biased towards packets associated to subflows of higher priority.

A data stream in the context used herein refers to any information or content that may be represented via a communication signal. Therefore, "data" is used in a generic sense, and may include applications, audio, video, documents, etc. or other information that may be transmitted. In accordance with the present invention, the data stream entering a network node or other module where policing will occur is parsed or "classified" into flows and subflows.

Classification into flows and subflows may be based on any desired packet characteristic, parameter, field, etc. For example, in one particular embodiment of the invention, flow and subflow classification is based on protocol layer information. Each packet arriving at a particular interface is associated with zero or one flow. Each packet associated with a flow can also, but not necessarily, be associated with a subflow. An exemplary approach to flow and subflow classification is set forth in FIG. 6, where protocol layer information is used to identify flows and subflows.

Referring to FIG. 6, the incoming packet 600 includes various embedded headers including a layer-4 transmission control protocol (TCP) header 602, a layer-3 internet protocol version-4 (IPv4) header 604, and a layer-2 ethernet protocol header 606. The packet 600 may be classified into a flow, and also may be classified into a subflow. For example, the IPv4 header 604 includes a variety of fields, two of which are shown as the source address (SA) field 608 and the destination address (DA) field 610. As is known in the art, the source address in an IP header identifies an address of the source of the transmission and the destination address identifies the desired destination of the transmission. In one embodiment of the invention, flows are distinguished from one another based on the destination address, or the source address, or both the source and destination addresses. For example, a data stream may include packets that identify a number of destination addresses, where each destination address or range of destination addresses is classified as a flow. In a more particular example, packets having a destination address directed towards a certain geographical area can be distinguished from the remaining packets, and different priorities may be assigned to each resulting flow.

The packet 600 may further be classified into subflows. For example, the TCP header 602 includes a variety of fields, one of which is a port number (PORT#) field 612. A port number is a way to identify a specific process to which an Internet or other network message is to be forwarded when it arrives at a node or server. For example, for the transmission control protocol (TCP) and the user datagram protocol (UDP), the port number is a number included in the header of a packet. TCP and UDP currently utilize a 16-bit integer in the header of the packet to identify the port number. Generally, this port number identifies a server or process. An example for both TCP and UDP is file transfer protocol (FTP) having an assigned port number of twenty-one, or Telnet having an assigned port number of twenty-three. Some services or processes have conventionally assigned permanent port numbers, often referred to as well-known port numbers. Alternatively, port numbers may be temporarily assigned for the duration of the request and its completion, often referred to as ephemeral port numbers. It should be recognized that any type of port number could be used to classify a subflow (or flow), as can any identifiable field in packet headers. In the example of FIG. 6, one or more subflows based on port number can be provided a higher or lower priority than one or more other subflows of that particular flow.

FIG. 7 illustrates an example of how a data stream can be classified into flows and subflows. The example of FIG. 7 assumes, for purposes of example, that TCP/IP is used to transmit packets such as packet 600 of FIG. 6. The data stream 700 includes multiple packets which may be classified by the layer-3 information, such as the source and/or destination addresses to distinguish the flows, and layer-4 information, such as TCP/UDP ports, to distinguish the subflows of each flow. For purposes of example, it will be assumed that a first flow Flow-A 702 is distinguished from a second flow Flow-B 704, and that the flow distinction is based on certain source addresses (SA) and/or destination addresses (DA). For example, packets of the data stream 700 having a particular destination address (or within a group of destination addresses) are classified into Flow-A 702, and packets having a particular source address (or within a group of source addresses) are classified into Flow-B 704. In this manner, Flow-A 702 and Flow-B 704 may be individually policed—i.e., Flow-A 702 may be associated with a different likelihood of packet dropping than Flow-B 704.

It should be recognized that the example of FIG. 7 is provided as an example only. Many other scenarios of classifying flows may be alternatively implemented. For example, flows may be classified using the same field, such as the SA (source address) field, or may be classified using both the SA and DA fields. In one embodiment, the classifier chooses which fields to use for classifying based on the protocols used in the packet.

Each flow may further be subdivided into subflows, which may have further have different drop priorities associated therewith. For example, Flow-B 704 may include three different subflows based on the port number. More specifically, a port number represented by P-1 in the TCP header may be classified as Subflow-A 706. A port number represented by P-2 may be classified as Subflow-B 708. A port number or all remaining port numbers represented by P-3 may be classified as Subflow-C 710. In this manner, particular port numbers may be classified into subflows, and granted a different drop priority than other subflows of that flow. The classification may be based on any desired parameter, and port number is provided for purposes of illustration only. It should further be recognized that in the examples where source addresses, destination addresses, and port numbers are used to classify flows and subflows, such classification may be based on groups of addresses or ports and not necessarily on a single address. For example, a flow may be represented by all source addresses coming from a particular geographic area, such as a household, a college campus, etc., such that the "source address" of the flow is actually a range or group of source addresses. Flows may be based on a particular user as well, such that the source address would identify a single source address. The same holds true for destination addresses, port numbers, or any other header field used to distinguish flows.

FIG. 8 is a block diagram illustrating how flows and subflows may be individually policed. Each of the flows, Flow-1 800, Flow-2 802, through Flow-n 804 may be individually metered, shaped, and subjected to selective packet discarding when its associated flow has exceeded its assigned bandwidth. Further, subflows may also be individually considered, as shown in FIG. 8. Flow-2 802 has been separated into Subflow-A 806 and Subflow-B 808. Each of these subflows is presented to a metering and dropping module, shown as modules 810, 812. Metering and dropping modules 810 and 812 are illustrated as separate modules, but may instead be a single module capable of performing the desired operations on all subflows (and flows), and may perform such operations for separate flows and subflows in parallel, in series, or some combination thereof. In any event, Subflow-A 806 and Subflow-B 808 are provided to modules 810, 812 respectively, where metering takes place, and where traffic shaping and/or packet discarding may occur. Subflow-A 806 includes packets which are metered and compared to a Subflow-A rate limit shown as input 814. Similarly, Subflow-B 808 includes packets that are metered and compared to a Subflow-B rate limit shown as input 816. In the example of FIG. 8, the packets associated with Subflow-A 806 have exceeded the Subflow-A rate limit 814, and therefore are discarded. The packets associated with Subflow-B 808, having been assigned a higher priority and therefore a higher rate limit, have successfully stayed within the bounds of the Subflow-B rate limit 816, and are successfully forwarded on without being discarded. In this manner, portions of a single flow may be granted a higher priority than other portions of the same flow.

Figure 9:
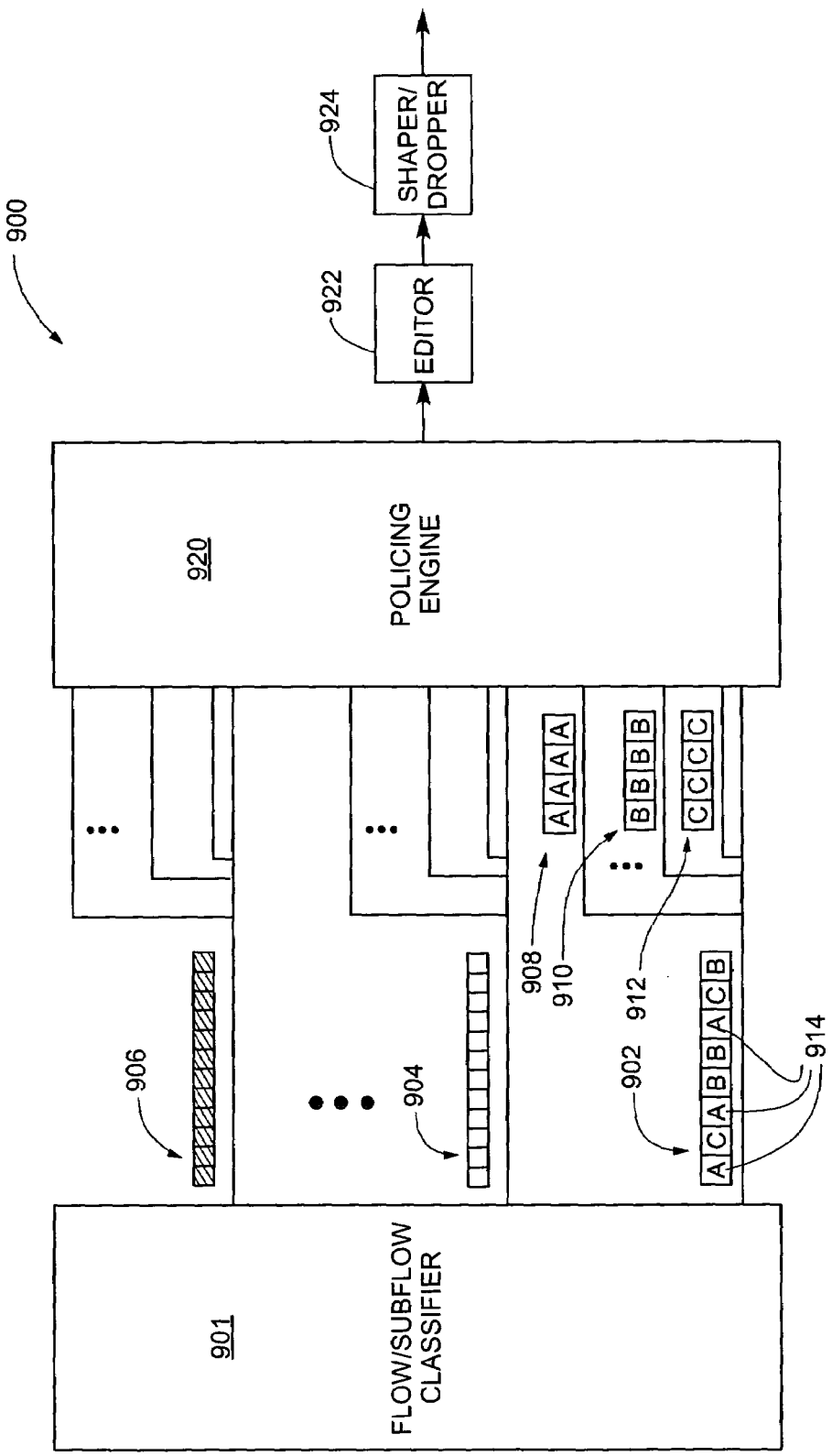
FIG. 9 is a block diagram illustrating an ingress processing system employing the principles of the present invention.

FIG. 9 is a block diagram illustrating a system 900 in which the principles of the invention may be implemented. The flow/subflow classifier 901 determines to which flow and subflow (if any) each packet of the data stream is to be associated. For example, the classifier 901 may analyze the header information, and insert a flow ID and subflow ID into a local header that can later be acknowledged. Alternatively, the classifier 901 may direct compare header information against stored flow/subflow parameters to determine whether the corresponding packets match with the stored flow/subflow parameters and therefore become part of the respective flow or subflow. For example, the desired flow and subflow parameters may be stored in a memory, and read from memory for comparison to the embedded header fields. The realization and benefits of such classification may be determined in a manner described herein and in copending U.S. patent application Ser. No. 09/849,913, entitled "A Method And Apparatus For Providing Multi-Protocol, Multi-Stage, Real-Time Frame Classification", filed concurrently herewith and assigned to the assignee of the instant application, the contents of which are incorporated herein by reference.

FIG. 9 further shows that a plurality of flows may result from the classification, shown as flows 902, 904 through an infinite number of flows represented by flow 906. Each of the flows has been distinguished from one another based on at least one header parameter (or other packet characteristic), which is depicted by the different colors for each flow. Branching off of each flow are one or more potential subflows. For example, the packets of flow 902 may be further distinguished into subflows based on a predetermined parameter or characteristic, shown for purposes of illustration as parameters A, B, and C. Therefore, each of the packets of flow 902 are labeled with a subflow identifier. It should be recognized that the classifier 901 may determine such subflows, and may provide a subflow identifier in a local header. Other alternatives may also be utilized, such as having additional classification modules to analyze each flow and separate the flow(s) into subflows where desired.

As the example of FIG. 9 shows, the flow 902 is separated into at least three subflows, shown as subflow 908, subflow 910, and subflow 912. The packets 914 of flow 902 are identified as being associated with subflow A, which is then depicted as a separate subflow 908. The same holds true for other subflows. The policing engine 920, in the illustrated embodiment, performs the metering to determine whether each flow and/or subflow is within an acceptable bandwidth range, which is dependent on the type of metering employed. For example, the policing engine 920 may employ the Generic Cell Rate Algorithm (GCRA), which is an algorithm used by an ATM switch to determine whether the cells of a connection conform to their traffic contract. Other examples include Single-Rate Three Color Marking (srTCM) and Two-Rate Three Color Marking (trTCM) methodologies, or any other traffic metering methodology. In connection with the present invention, metering of bandwidth usage of individual flows may be performed using various policing methodologies, including credit-token and variants of credit-token (also known as, the leaky bucket) methodologies. Examples of these are GCRA for ATM based traffic, and the three-color markers for communications infrastructures based on IP supporting differentiated services. Variants of credit-token methodologies use a running count of tokens that increment at rate proportional to the committed information rate, and decrement at a rate proportional to the bandwidth used. If a packet arrives at a time when there are not enough credit tokens, it is ruled as "not conforming" to the committed rate. The three color markers mentioned above use two such credit token buckets, one for measuring a flow's conformance to the committed rate, and another for measuring the flow's conformance to the peak rate. The realization and benefits of such metering may be determined in a manner described herein and in copending U.S. patent application Ser. No. 09/849,914, entitled "System And Method For Policing Multiple Data Flows And Multi-Protocol Data Flows", filed concurrently herewith and assigned to the assignee of the instant application, the contents of which are incorporated herein by reference.

Depending on the particular configuration employed, an editor module 922 and a shaper/dropper module 924 may also be implemented within the system 900. The editor may be used where the policing method requires that information within the packet, such as within a header, be modified in response to the policing action. For example, where srTCM or trTCM is employed, the packet may be modified by editor 922 to update the "color" of the packet, which can then be used by the shaper/dropper 924 to accept or discard the packet. In another embodiment, the discarding function of the shaper/dropper module 924 may be incorporated into the editor 922. One such embodiment is described in copending U.S. patent application Ser. No. 09/849,804, entitled "System And Method For Providing Transformation Of Multi-Protocol Packets In A Data Stream", filed concurrently herewith and assigned to the assignee of the instant application, the contents of which are incorporated herein by reference. In such a case, the editor 922 disregards the packet information temporarily being stored in an editor memory, and allows the next packet to overwrite the packet to be discarded.

As can be seen from the system 900 of FIG. 9, a data stream may be logically separated into a plurality of flows (e.g., flows 902, 904 through 906), which can then be further separated into a plurality of subflows (e.g., subflows 912, 910 through 908). The policing engine 920 meters each of the flows and subflows to determine whether or not the flow and/or subflow is conforming to predetermined conformance parameters. In some cases, the packets of the flow/subflow may be modified by editor 922, particularly where such modification provides an indication as to whether the packet should be forwarded, forwarded best-effort, or discarded. Traffic shaping and/or packet forwarding/discarding for each of the flows and subflows may be implemented, as seen by shaper/dropper 924.

Figure 10:
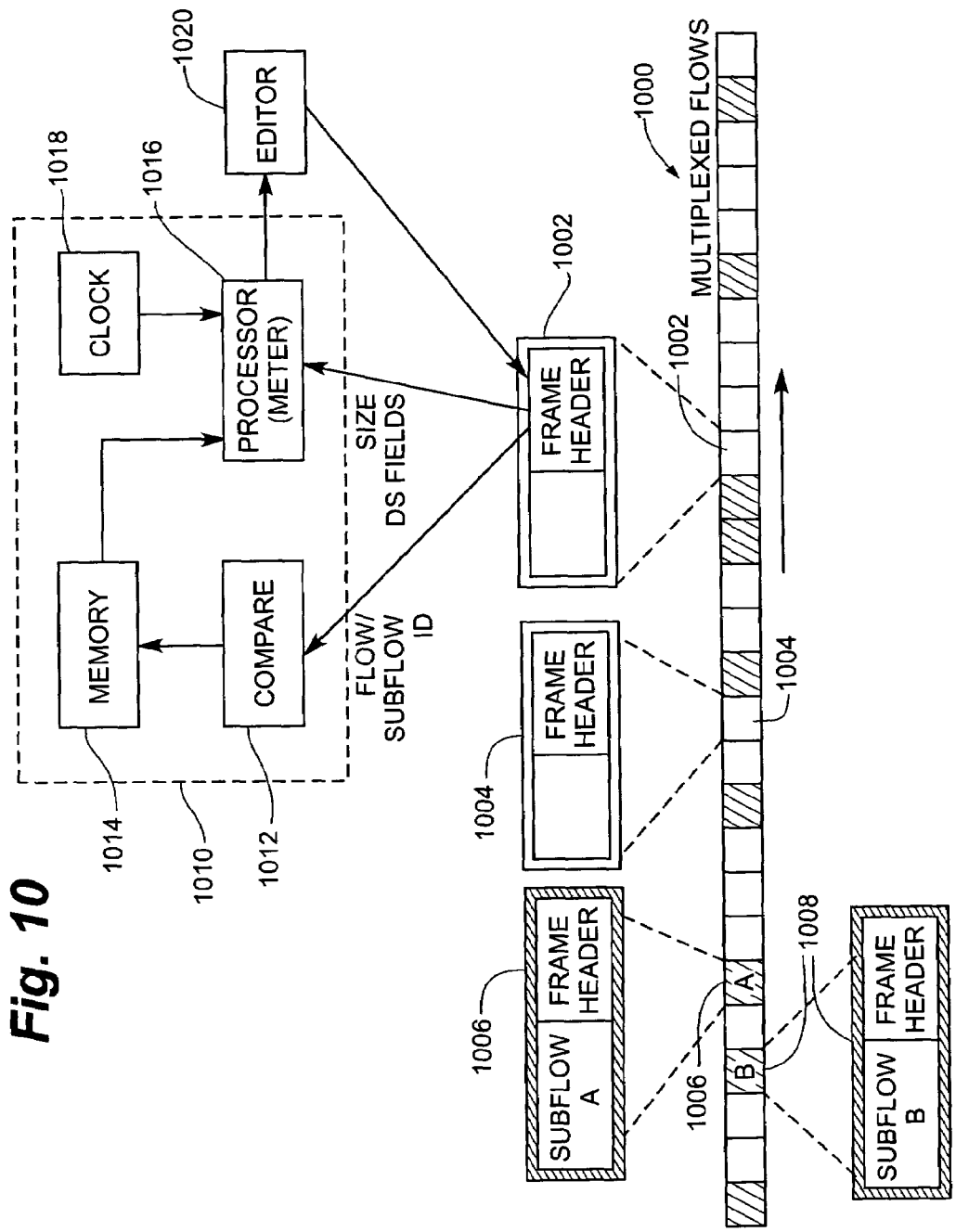
FIG. 10 is a block diagram illustrating a more detailed embodiment of the policing of flows and subflows in accordance with one embodiment of the invention.

FIG. 10 is a block diagram illustrating a more detailed embodiment of the policing of flows and subflows in accordance with the invention. FIG. 10 illustrates that individual packets form a single communications traffic stream 1000, and are classified into several flows. As previously indicated, classification may be based on any criteria, such as the original sender of the packet, the ultimate receiver of the packet, both the sender and receiver of the packet, etc. Packet 1002 is classified as being part of a first flow, packet 1004 is classified as being part of a second flow, and packet 1006 is classified as being part of a third flow. Also illustrated is the separation of the third flow into at least two subflows. For example, within the data stream 1000, at least some of the packets corresponding to the third flow are identified with a subflow identifier, such as packet 1006 being identified as subflow-A and packet 1008 being identified as subflow-B.

Each packet within a flow or subflow is presented to the policing module 1010. Flows whose effective bit rate exceeds what is committed in the service contract will be classified as non-conforming, which will have a higher likelihood of being discarded than conforming packets. Subflows exceeding their predetermined rate limit will be subject to discarding, even though there may still be enough contracted bandwidth at the flow level to rule this packet as conforming.

The flow or subflow ID is identified, such as by the compare module 1012 which compares the flow ID received from the packet 1002 to stored data. Once the flow or subflow is identified, flow parameters are requested from the memory 1014, such as the token count and last pass time variables for that flow. If a subflow is being analyzed, a rate limit established for that subflow is requested from the memory 1014 to determine the subflow's conformance. As previously indicated, different subflows of a flow may be prioritized differently, thus having different rate limits stored in the memory 1014. When that particular subflow accesses its rate limit from memory, that subflow may be metered independent of the other subflows. The requested parameters for flows and subflows is provided to the metering module 1016, which in the illustrated embodiment is a processing device. The size of the packet and current policing state (e.g., color in a color policing system) are also provided to the metering module 1016. The current time is determined from input from the clock 1018, whereby various rates may be determined such as the committed information rate (CIR), the peak information rate (PIR), etc. The flow variables may be updated in the memory 1014. Given any existing packet policing parameters (e.g., color), the size of the packet, time of arrival, token count, last pass time, etc., metering may be performed by metering module 1016 to carry out a policing algorithm to associate with the packet under consideration. The packet may then be accepted or dropped, or may be provided to an editor module 1020 which modifies the original packet 1002 to include the new policing information. The modified packet, with its policing information, may then continue on its path to ultimately be presented to a module (not shown) that will make packet discarding decisions based on the policing information modified into the packet.

Figure 11:
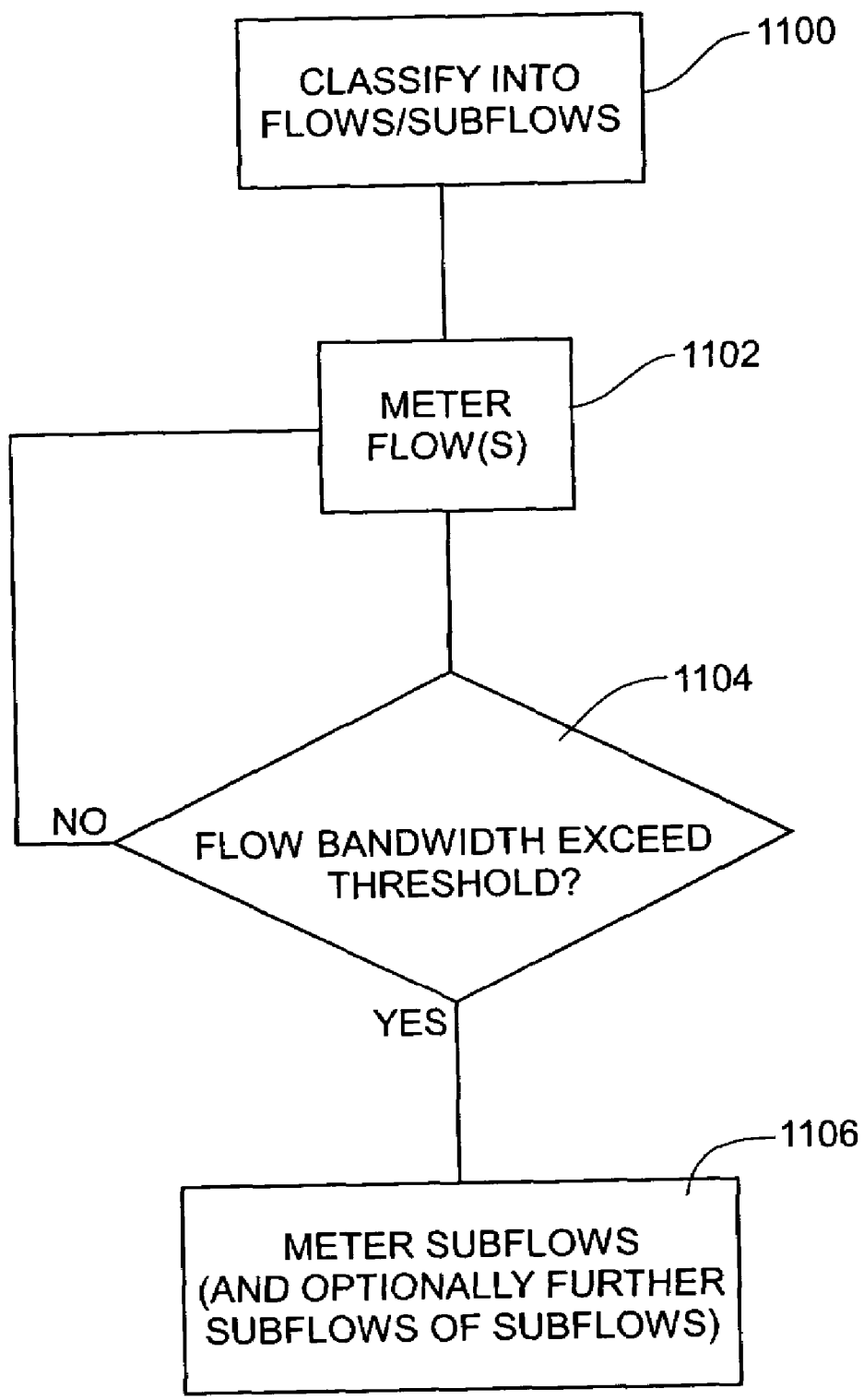
FIG. 11 is a flow diagram illustrating one embodiment of a policing methodology for providing hierarchical policing of flows and subflows of a data stream.

FIG. 11 is a flow diagram illustrating one embodiment of a policing methodology for providing hierarchical policing of flows and subflows of a data stream. The data stream is classified 1100 into flows and subflows (if any). Classification may be effected as described above, and includes classifying flows and subflows based on protocol layer information. Each of the flows may be individually metered 1102, and collectively is bounded by the contracted bandwidth or quality of service (QoS). At some point, bandwidth levels (e.g., credit levels) used for policing flows may fall below a threshold level, as determined at decision block 1104. If the bandwidth levels have not exceeded this threshold, the flows may continue to be metered 1102 without regard to individual subflow metering, and all packets in that flow will receive the same drop probability. However, if the bandwidth exceeds the threshold as determined at decision block 1104, subflows of a particular one or more flows may be metered as shown at block 1106. Therefore, when per-flow bandwidth levels are high (e.g., per-flow credit levels are low), packets associated with subflows are metered as well, and different subflows may be associated with different priorities, thereby allowing for packet acceptance bias at the subflow level.

Packets associated with subflows that have exceeded their rate limits will be ruled as non-conforming, even if there is still enough bandwidth (e.g., credit tokens) at the flow level to rule this packet as conforming. In the case of metering using a credit bucket, credits that should have been used by these packets remain in the flow's credit pool, thereby making these credits available for packets of subflows that have not exceeded their limits. Thus, subflows of higher priorities have higher credit limits. A null subflow may be reserved for message classes that are of the highest priority, thereby having no credit limit.

In accordance with the invention, the metering of subflows (e.g., block 1106 of FIG. 11) includes one or more subflow layers. For example, the invention contemplates metering one or more subflows from a flow, and also contemplates metering further subflows from a subflow. In this manner, a layered approach to policing is realized, providing a great deal of control with respect to policing, shaping, discarding, and other such functions. In a more specific example, a data stream can be classified into one or more flows, such as three flows based on different destination addresses at the network layer 3. Any one or more of the flows can be classified into a number of subflows, such as a first of the flows having two subflows based on the port number identified at the transport layer 4. This can continue, for example, by further classifying the subflow corresponding to a particular port number into further subflows. This layering methodology can be applied in order to achieve any desired level of policing control.

Figure 12:
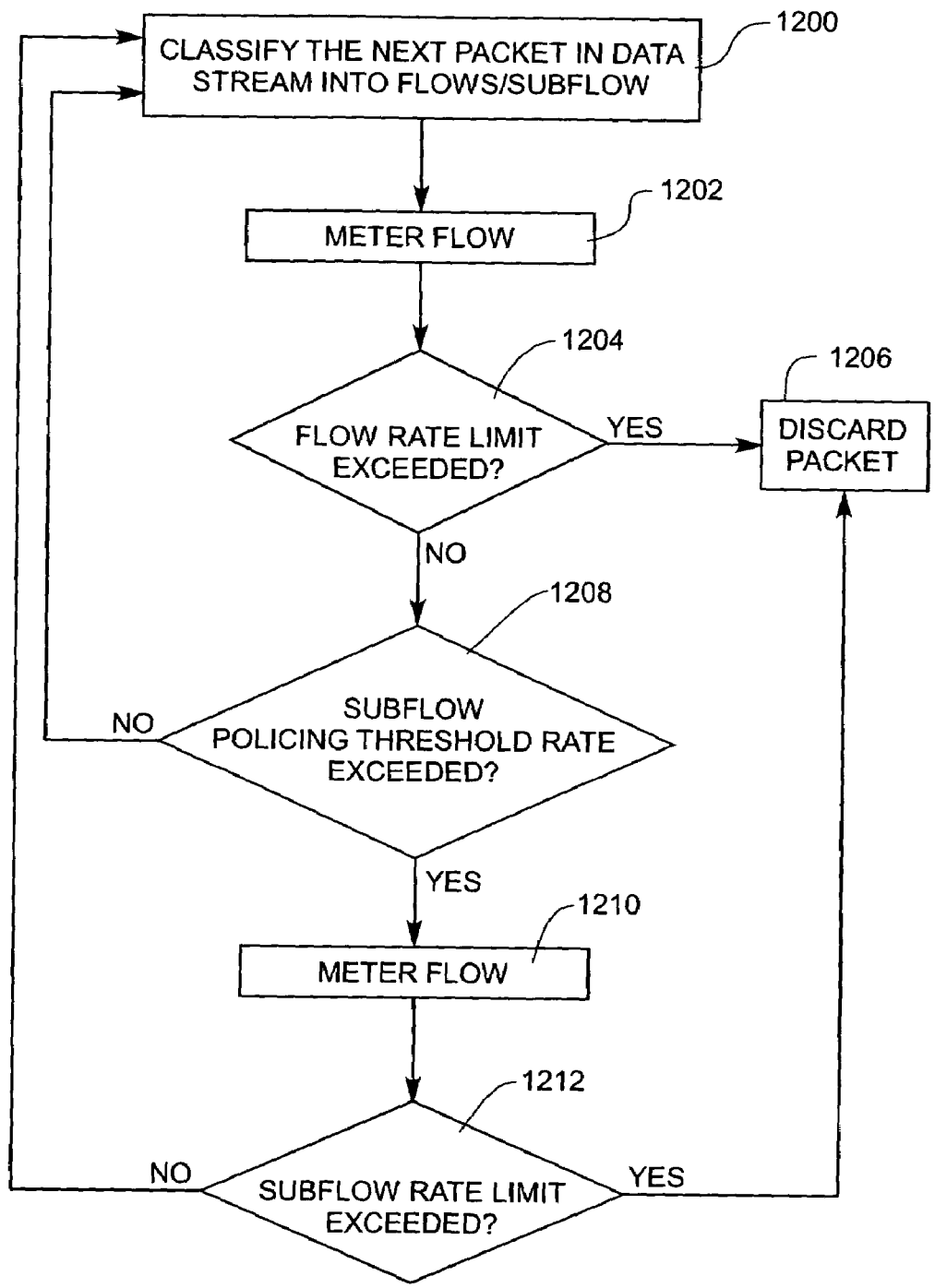
FIGS. 12 and 13 illustrate particular embodiments of policing methodologies for providing hierarchical policing of flows and subflows of a data stream in accordance with the invention.

FIG. 12 is a more detailed embodiment of a policing methodology for providing hierarchical policing of flows and subflows of a data stream. The embodiment of FIG. 12 assumes a metering methodology that utilizes a credit bucket approach. The data stream is classified 1200 into flows and subflows, and one or more of the resulting flows are metered 1202. When the flow rate limit has been exceeded 1204, as determined from the credit levels, the packet is discarded 1206, or at a minimum marked as non-conforming. If the flow rate limit has not been exceeded, it is determined 1208 whether a subflow policing threshold rate has been exceeded. If not, the next packet in the data stream can be classified 1200 into flows/subflows. If the subflow policing threshold rate has been exceeded, this means that the policing of subflows is enabled, and the subflow may be metered 1210. If the subflow rate limit is exceeded 1212, the packet is discarded 1206. Otherwise, the next packet in the data stream can be classified 1200 into flows/subflows.

The subflow policing threshold rate of block 1208 refers to a threshold in which subflow policing is enabled. In one embodiment of the invention, subflow policing is enabled when bandwidth capacity indicators, such as credit levels in a credit-token approach, have fallen below a predetermined threshold. This predetermined threshold is a configurable parameter that may be set to any desired credit level in the range of potential credit levels. For example, the threshold may be set to the maximum credit level, thereby forcing policing at the subflow level at all times. In other embodiments of the invention, subflow policing is enabled only when the credit levels have dropped to some level below the maximum credit level.

When per-flow credit levels remain high, indicating low bandwidth consumption, all packets in that flow receive the same low drop probability. Each subflow is assigned a configurable rate limit, and may be metered using the same policing methodology used to meter the flows. When per-flow credit levels are low, packets associated with subflows that have exceeded their rate limits may be ruled as non-conforming, even if the credit level for the flow is sufficient to rule the packet as conforming. Therefore, credits that otherwise would have been used by these packets remain in the flow's credit pool, which effectively makes these unused credits available for packets of subflows that have not exceeded their respective rate limits. In this manner, a subflow, regardless of its rate limit, may be allowed to essentially utilize all of the available bandwidth available to the flow, where the other subflows are not utilizing bandwidth. For example, one or more subflows may not require bandwidth due to low packet volume for that subflow and/or an associated rate limit that results in marking those packets as non-conforming. This would allow another subflow having a higher rate limit to exploit the available bandwidth. Alternatively, multiple subflows may share the available bandwidth based on their respective rate limits.

Thus, a subflow can obtain additional bandwidth of the flow, even beyond its predetermined rate limit, where the other subflows are not using that bandwidth. For example, where four subflows are each associated with a rate limit of 25 Mbit/s, but three of the four subflows are not utilizing any significant bandwidth, the available bandwidth of the flow may be allocated to the subflow requiring the bandwidth, even if it exceeds its configured rate limit. Packets exceeding their contracted rate limits may be marked as non-conforming, but may not be discarded if the available bandwidth of the flow is not exceeded. If and when the other subflows begin to demand bandwidth, the bandwidth availability will be shared among the subflows.

In the case where further subflows are classified (i.e., subflows of subflows), then additional subflow rate limit monitoring also occurs for those lower level subflows. Thus, the operations associated with the subflows may all be applied to subflows of any level in the hierarchy. For example, a subflow of a flow may be further divided into its own subflows, and again into further subflows, and so on. Further, while metering of subflows may be carried out in series as illustrated in FIG. 12, it should be understood that subflow metering may be carried out in parallel, as the serial nature of the flowchart of FIG. 12 is for purposes of obtaining an understanding of one aspect of the invention.

Figure 13:
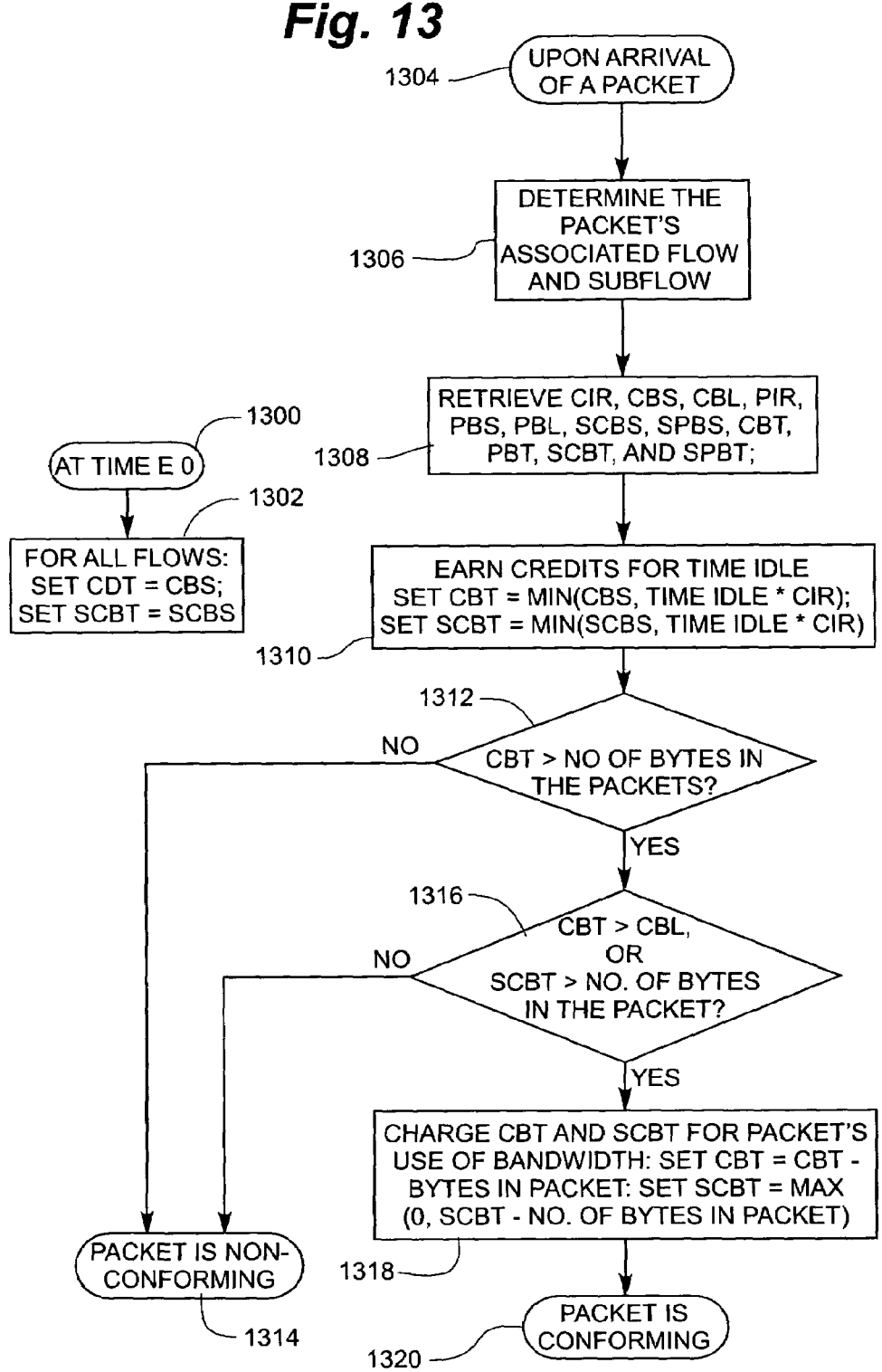

FIG. 13 is another embodiment of a policing methodology for providing hierarchical policing of flows and subflows of a data stream. The variables described in connection with the flow diagram of FIG. 13 are presented in Table 1 below:

TABLE 1

| VARIABLE | DESCRIPTION |
| --- | --- |
| CIR | Committed Information Rate |
| CBS | Committed Burst Size |
| CBL | Committed Rate Subflow Policing Trigger Level |
| PIR | Peak Information Rate |
| PBS | Peak Burst Size |
| PBL | Peak Rate Subflow Policing Trigger Level |
| SCBS | Committed Burst Size for the Subflow |
| SPBS | Peak Burst Size for the Subflow |
| CBT | Current Level of Committed Rate Credit Tokens |
| PBT | Current Level of Peak Rate Credit Tokens |
| SCBT | Current Level of Committed Rate Credit Tokens for the Subflow |
| SPBT | Current Level of Peak Rate Credit Tokens for the Subflow |

As shown in FIG. 13, at time t=0 1300, all of the "current" levels are set to their committed or peak counterparts as shown at block 1302. For example, the current level of committed rate credit tokens (CBT) is set to the committed burst size (CBS). This is because no tokens have been removed from the credit bucket at the time of initiation, and thus the current level is equivalent to the committed burst size.

Upon arrival of a packet 1304, the packet's associated flow and subflow are determined 1306. Each of the stored parameters are retrieved 1308 from memory, including the CIR, CBS, CBL, PIR, PBS, PBL, SCBS, SPBS, CBT, PBT, SCBT and SPBT. Credits are earned 1310 for time idle. In such case, the CBT is set to the minimum of the CBS or the result of a function defined by a product of the idle time and the CIR. The CIR is a rate in bytes per second, and the "time idle" is the time that in which no bandwidth is utilized. The product is therefore a number of bytes, and the minimum of this number of bytes or the CBS becomes the CBT value. A similar process is used to earn credits for the other "current levels," including the SCBT.

Where the number of bytes in the packet is greater than (or equal to) the current level of committed rate credit tokens (CBT) as determined at decision block 1312, the packet is non-conforming 1314. If the CBT is greater than the number of bytes in the packet, it is determined 1316 whether CBT is greater than CBL, or whether the SCBT is greater than the number of bytes in the packet. If neither of these conditions are true, the packet is non-conforming 1314.

If the CBT is greater than the CBL, or the SCBT is greater than the number of bytes in the packet, then the CBT and SCBT may be charged for the packet's use of bandwidth, as seen at block 1318. In such a case, the CBT is set to the CBT minus the number of bytes in the packet, the SCBT is set to the maximum of zero or the SCBT minus the number of bytes in the packet, and the packet is deemed to be conforming 1320.

For three-color marker embodiments, policing of subflows activates on two occasions. First, when the credit level for the committed information rate (CIR) falls below the first trigger level, and second, when the credit level for the peak information rate (PIR) falls below a second trigger level. Each subflow is associated with both a committed and peak rate.

Figure 14A:
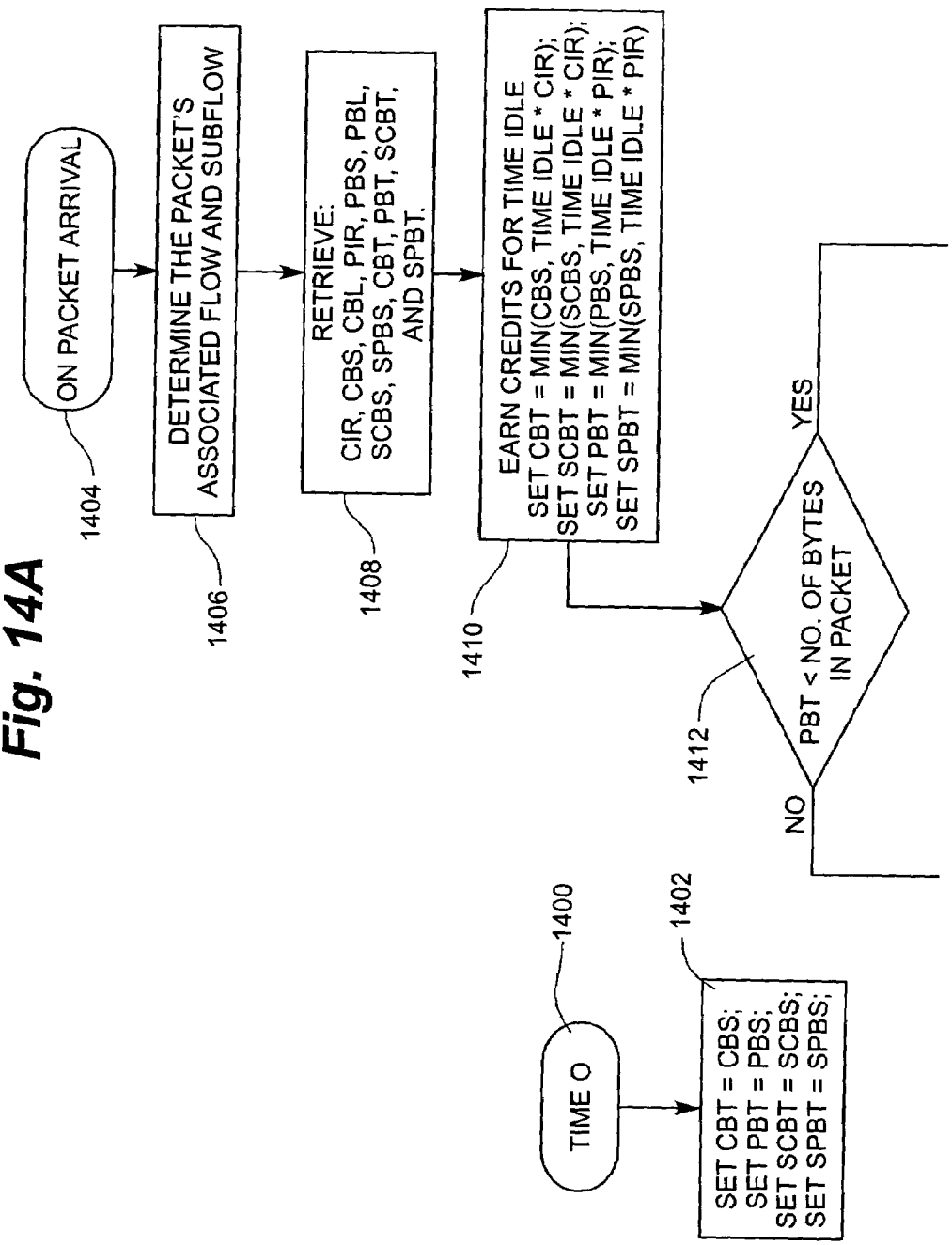
FIG. 14 is an embodiment of a three color marker policing methodology for providing hierarchical policing of flows and subflows of a data stream.
Figure 14B:
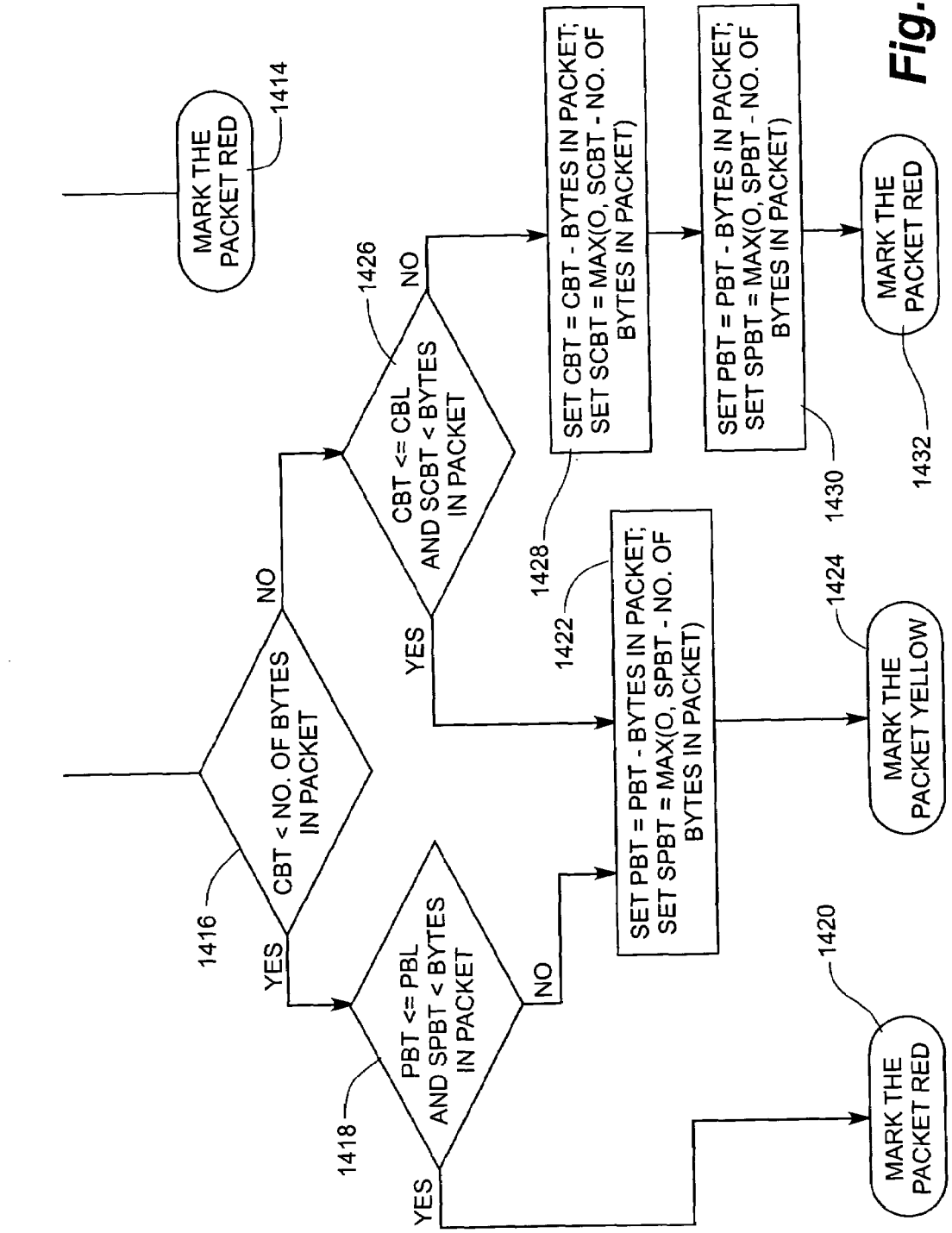

FIG. 14 is an embodiment of a three color marker policing methodology for providing hierarchical policing of flows and subflows of a data stream. The variables described in connection with the flow diagram of FIG. 14 are the same as those previously presented in Table 1. At time t=0 1400, all of the "current" levels are set to their committed or peak counterparts as shown at block 1402. For example, the current level of committed rate credit tokens (CBT) is set to the committed burst size (CBS). This is because no tokens have been removed from the credit bucket at the time of initiation, and thus the current level is equivalent to the committed burst size.

Upon arrival of a packet 1404, the packet's associated flow and subflow are determined 1406. Each of the stored parameters are retrieved 1408 from memory. Credits are earned 1410 for time idle. For example, the CBT is set to the minimum of the CBS or the result of a function defined by a product of the idle time and the CIR. The CIR is a rate in bytes per second, and the "time idle" is the time that in which no bandwidth is utilized. The product is therefore a number of bytes, and the minimum of this number of bytes or the CBS becomes the CBT value. A similar process is used to earn credits for the other "current levels," including the SCBT, PBT, and SPBT.

If the current level of peak rate credit tokens (PBT) is less than the number of bytes in the packet as determined at decision block 1412, the packet is marked red 1414. If not, it is determined 1416 whether the current level of committed rate credit tokens (CBT) is less than the number of bytes in the packet. If so, it is determined 1418 whether PBT is less than or equal to PBL and SPBT is less than the number of bytes in the packet. If these conditions are both true, the packet is marked red 1420. Otherwise, if one or both of these conditions are not true, then the PBT is set to the PBT minus the number of bytes in the packet, and the SPBT is set to the maximum of zero or the SPBT minus the number of bytes in the packet as shown at block 1422, and the packet is marked yellow 1424.

Returning to decision block 1416, if the CBT is not less than the number of bytes in the packet, it is determined 1426 whether CBT is less than or equal to CBL and the SCBT is less than the number of bytes in the packet. If so, the PBT is set to the PBT minus the number of bytes in the packet, and the SPBT is set to the maximum of zero or the SPBT minus the number of bytes in the packet as shown at block 1422, and the packet is marked yellow 1424. Otherwise, if one or both of these conditions are not true, then the CBT is set to the CBT minus the number of bytes in the packet, and the SCBT is set to the maximum of zero or the SCBT minus the number of bytes in the packet as shown at block 1428. Further, the PBT is set to the PBT minus the number of bytes in the packet, and the SPBT is set to the maximum of zero or the SPBT minus the number of bytes in the packet as shown at block 1430, and the packet is marked green 1432.

One particularly beneficial feature of the present invention is the ability to maximize use of the available flow bandwidth through subflow bandwidth allocation techniques. In accordance with a particular embodiment of the invention, exploitation of the available bandwidth of the flow can be maximized by guaranteeing conformance for one subflow, while using "best efforts" for other subflows beyond their respective rate limits. Therefore, a high-priority subflow can be guaranteed conformance without regard to whether the entire flow is in conformance. For critical traffic, a subflow may therefore be marked as conforming even though the main flow is out of conformance.

As an example, assume a household has multiple systems with a total flow bandwidth of 100 Mbit/s. Each of the systems (i.e., subflows) may be utilizing 25% of the bandwidth for video such that the entire flow is in conformance. If a high-priority voice subflow is then activated through a telephone call, this subflow may be guaranteed a certain bandwidth, such as 1 Mbit/s. In this case, the subflow will be guaranteed this bandwidth, even though some packets associated with other subflows (i.e., video subflows) may ultimately be marked as non-conforming for a period of time and potentially dropped. The video subflows will ultimately readjust their bandwidth usage to try to come into conformance. In this manner, substantially the entire flow bandwidth can be exploited by guaranteeing a certain bandwidth for a high-priority subflow, while using best efforts (but guaranteed to a predetermined rate limit) for the other subflows.

FIG. 15 is a flow diagram illustrating an embodiment as described above, where exploitation of the available bandwidth of the flow can be maximized by guaranteeing conformance for one subflow, while using best efforts for other subflows beyond their respective rate limits. The data stream is classified 1500 into flows and subflows. Subflow policing is enabled 1502 upon the flow reaching a predetermined threshold bandwidth. Each of the subflows is individually policed 1504. However, as shown at block 1506, a particular high-priority subflow may be guaranteed a certain bandwidth, even though the flow may become partially non-conforming: In other words, the need for additional bandwidth to accommodate this high-priority subflow may cause the flow to exceed its bandwidth conformance parameters, but this will not affect the bandwidth of the guaranteed-bandwidth subflow. Rather, the other subflows may begin to be marked non-conforming if the flow becomes non-conforming as shown at block 1508. The bandwidth of these other subflows is adjusted 1510 to bring the flow back into conformance.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, fixed (hard) disk drives, diskettes, CD-ROMs, optical disks, magnetic tape, semiconductor memories such as RAM, ROM, PROMs, etc. Transmitting devices include, but are not limited to, the Internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

One skilled in the art of computer science will easily be able to combine the software created as described with appropriate general purpose or special purpose computer hardware to create a computer system and/or computer subcomponents embodying the invention, and to create a computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A packet policing system for providing layered policing of packets of a data stream, comprising: A) a classifier to receive and parse the data stream into a plurality of traffic flows, and to parse at least one of the traffic flows into a plurality of subflows; and B) a policing engine coupled to the classifier to receive each of the subflows, and to individually meter each of the subflows associated with the at least traffic flow in accordance with predefined subflow priorities assigned to each of the subflows.

2. The packet policing system as in claim 1, wherein the policing engine includes a memory to store the predefined subflow priorities assigned to each of the subflows.

3. The packet policing system as in claim 2, wherein the predefined subflow priorities include predefined rate limits.

4. The packet policing system as in claim 3, wherein the policing engine includes a processor coupled to receive the rate limits for each of the subflows, to compare a subflow packet rate for each of the subflows to its respective rate limit, and to provide a conformance rating in response thereto.

5. The packet policing system as in claim 4, further comprising an editing module coupled to the policing engine to modify each of the packets of each subflow with the conformance rating provided by the processor.

6. The packet policing system as in claim 5, further comprising a packet drop module coupled to receive the modified packets from the editing module, and to accept or discard each of the modified packets based on the conformance rating.

7. The packet policing system as in claim 1, further comprising a packet drop module coupled to receive the modified packets from the policing engine in response to the individual metering of the subflows.

8. A method for providing layered policing of packets of a data stream, comprising: parsing the data stream into one or more flows; parsing at least one of the flows into a high-priority subflow and at least one standard subflow; enabling the high-priority and standard subflows to be monitored for bandwidth conformance when the at least flow reaches a predetermined bandwidth threshold; marking the high-priority subflow as conforming while allowing the standard subflows to be marked as non-conforming if the at least flow becomes non-conforming; where the at least flow has become non-conforming, adjusting the bandwidth of the standard subflows to bring the at least flow into conformance.

9. A method for maximizing exploitation of a contracted bandwidth for a flow, comprising: parsing the flow into a high-priority subflow and at least one standard subflow; assigning rate limits to the high-priority subflow and the at least one standard subflow; monitoring packet conformance on a subflow level when the flow decreases to a predetermined bandwidth capacity; providing guaranteed bandwidth to the high-priority subflow while providing best effort bandwidth to the at least one standard subflow, regardless of whether the flow has exceeded its contracted bandwidth; if the flow has exceeded its contracted bandwidth, adjusting the bandwidth of the at least one standard subflow to bring the flow into conformance, while maintaining the guaranteed bandwidth to the high-priority subflow.

* * * * *